(12) United States Patent
Yamada et al.

(10) Patent No.: US 6,947,879 B2
(45) Date of Patent: Sep. 20, 2005

(54) MESH GENERATION SYSTEM, DESIGN SUPPORT SYSTEM, ANALYSIS SYSTEM, ANALYSIS METHOD, MESH GENERATION METHOD, AND STORAGE MEDIUM AND PROGRAM TRANSMISSION APPARATUS THEREFOR

(75) Inventors: Atsushi Yamada, Yokohama (JP); Keisuke Inoue, Sagamihara (JP); Takayuki Itoh, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 09/854,219

(22) Filed: May 11, 2001

(65) Prior Publication Data

US 2002/0042697 A1 Apr. 11, 2002

(30) Foreign Application Priority Data

Jun. 19, 2000 (JP) ...................................... 2000-183026

(51) Int. Cl.$^7$ ............................................... G06F 17/10
(52) U.S. Cl. ............................................. 703/2; 716/20
(58) Field of Search ............................... 716/20; 703/1, 703/2

(56) References Cited

U.S. PATENT DOCUMENTS 5,625,578 A * 4/1997 Du Cloux et al. ............... 703/2
5,946,479 A * 8/1999 Sakaguchi et al. ............ 716/20
6,618,694 B1 * 9/2003 Shibuya et al. ................. 703/1

FOREIGN PATENT DOCUMENTS

JP 2000-155859 6/2000

OTHER PUBLICATIONS

Japanese Office Action JP9000125 dated Feb. 25, 2003.
Alexa, M. Local Control for Mesh Morphing, SMI 2001 International Conference on Shape Modeling and Applications, IEEE, May 2001, pp. 209–215.*
Kanai et al., T. Metamorphosis of Arbitary Triangular Meshes, IEEE, Computer Graphics and Applications, vol. 20, No. 2, Mar.–Apr. 2000, pp. 62–75.*
Konyha et al., L. Content–Based Mesh Generation Algorithm, 4th EURASIP Conference on Video/Image Processing and Multimedia Communications, vol. 1, Jul. 2003, pp. 175–180.*
Khalladi et al., M. RCS of Arbitrarily–Shaped Targets with the TLM Method, IEEE Transactions on Antennas and Propagation, vol. 42, No. 6, Jun. 1994, pp. 891–893.*
Maier et al., C. Equivalent Circuit Model of Resistive IC Sensors Derived with the Box Integration Method, IEEE Transactions on Computer–Aided Design of Integrated Circuits and Systems, vol. 18, No. 7, Jul. 1999, pp. 1000–1013.*

* cited by examiner

Primary Examiner—Russell Frejd
(74) Attorney, Agent, or Firm—Whitham, Curtis & Christofferson, P.C.; Stephen C. Kaufman

(57) ABSTRACT

It is one object of the present invention to form a conventional mesh as a sample in order to efficiently generate a high-quality mesh for a predetermined shape model.

A mesh generation system 10 for generating a mesh used for finite element analysis comprises: a mesh characteristic extraction unit 11 for receiving a conventional mesh and extracting a characteristic therefrom; and a mesh generator 13 for receiving a target shape model for mesh generation, and for generating a mesh for the shape model based on the characteristic of the conventional mesh extracted by the mesh characteristic extraction unit 11.

23 Claims, 21 Drawing Sheets

SHAPE MODEL

TEMPLATE MESH

TENSOR FIELD

GENERATED MESH

10mm PITCH

3mm PITCH

6mm PITCH

12mm PITCH

15mm PITCH

18mm PITCH

SHAPE MODEL

TEMPLATE MESH

SHAPE MODEL

GENERATED MESH

TEMPLATE MESH

AREA OF SHAPE MODEL

EXTRAPOLATED TENSOR FIELD

GENERATED MESH

SHAPE MODEL

TEMPLATE MESH

SHAPE MODEL

GENERATED MESH

SHAPE MODEL

TEMPLATE MESH

SHAPE MODEL

GENERATED MESH

SHAPE MODEL

TEMPLATE MESH

SHAPE MODEL

GENERATED MESH

SHAPE MODEL HAVING
INNER LINE RESTRICTION

TEMPLATE MESH

SHAPE MODEL HAVING NO
INNER LINE RESTRICTION

GENERATED MESH

SHAPE MODEL HAVING
INNER LINE RESTRICTION

TEMPLATE MESH

SHAPE MODEL HAVING NO
INNER LINE RESTRICTION

GENERATED MESH

MESH GENERATION SYSTEM, DESIGN SUPPORT SYSTEM, ANALYSIS SYSTEM, ANALYSIS METHOD, MESH GENERATION METHOD, AND STORAGE MEDIUM AND PROGRAM TRANSMISSION APPARATUS THEREFOR

DETAILED DESCRIPTION OF THE INVENTION

1. Field of the Invention

The present invention relates to a method for generating a mesh for a shape model in order to perform finite element analysis using CAD (Computer Aided Design) or CAE (Computer Aided Engineering).

2. Background Art

At present, CAD or CAE applications that use computers for design or simulation are generally employed in the manufacturing field.

FIG. 21 is a flowchart for explaining the use of a computer for a design cycle in the manufacturing process. In FIG. 21, a target shape model is prepared (step 2101), and a mesh is generated on the surface of the shape model (step 2102). Then, finite element analysis is performed for the mesh (step 2103), and the analysis results are displayed on a display device and evaluated (step 2104). During this evaluation, a portion wherein the strength is insufficient is specified, for example, and the result is reflected in a design change (step 2101).

Most conventional CAD or CAE applications include functions for automatically generating meshes for target shape models. However, since an automatic mesh generation function mechanically applies a specified rule each time a mesh is generated, the quality of an obtained mesh tends not to be high enough for analysis use.

A high-quality mesh is one wherein the intent of the designer can be reflected in the analysis; a mesh that is so designed that the performance of an adequate analysis is possible.

The conditions required for an adequate analysis of a mesh differ, depending on various circumstances, such as the shape or the material of which an object is composed and the analysis type (stress analysis, vibration analysis, collision analysis, temperature distribution analysis, etc.). For example, for the analysis of the stress that is exerted by applying pressure at one point on a predetermined object, to increase the analysis accuracy, it is preferable that a smaller mesh be used at and around the periphery of the point at which the pressure is to be applied. Therefore, when the point whereat pressure is to be applied is changed, accordingly, a completely different mesh must be generated for the object.

Therefore, a designer first uses the automatic mesh generation function to generate a temporary mesh, and then, to obtain a high-quality mesh corresponding to various analysis conditions, manually corrects the automatically provided mesh by reconnecting the edge or by moving the vertex of the mesh.

During the design process, there are cases wherein, for the same shape model, multiple meshes are generated for which different mesh sizes and mesh element arrangement direction characteristics are required. As examples, in one case, an uncomplicated analysis using a rough mesh may be performed at the initial design step, while a detailed analysis using a fine mesh may be performed at the final design step; and in another case, to perform several analysis processes for the same shape model, meshes having characteristics corresponding to several types of analyses may be generated.

And then, when shape models for multiple objects resemble each other, for these shape models it may be necessary to generate a mesh having a common characteristic.

FIG. 22 is a diagram for explaining an example conventional mesh generation process.

For the buckling problem shown in FIG. 22, it is preferable that the direction in which the mesh elements are arranged correspond as nearly as possible to the direction in which the elements buckle under weight. Therefore, a mesh (see (1-*b*)) that is automatically generated by the automatic mesh generation function of a CAD or CAE application must, as needed, be manually corrected by a designer (see (1-*c*)).

Consider, for the plate-shape buckling problem, a case wherein the position of a notch for permitting buckling is changed. During the conventional mesh generation process, a new mesh must be generated in the same manner for the shape model after the alteration has been performed. That is, a mesh that is automatically generated by a CAD or CAE application (see (2-*b*)) must be manually corrected by a designer (see (2-*c*)).

Therefore, to generate meshes having different characteristics for the same shape model, or to generate a mesh having a common characteristic for multiple similar shape models, conventionally, the mesh generation operation using a shape model is performed each time.

As is described above, the conventional generation of multiple meshes requires separate procedures. Therefore, in a system, such as a CAD application, a process for entering data for mesh generation and a process for manually correcting an obtained mesh must be performed each time a mesh is generated.

However, for the mesh generation data entering process and the mesh correction process, there are many overlapping procedures performed in a case wherein meshes having different characteristics are generated for the same shape model, and in a case wherein only one part of the characteristics are changed, such when only the size of a mesh is changed while the mesh element arrangement direction is maintained.

In addition, for multiple shape models having similar shapes for which a mesh having a common characteristic is generated, it is preferable that when the shape model is changed only slightly, as is shown in FIG. 22, a mesh having a similar characteristic be generated for a portion other than the periphery of the shape change location. Therefore, in many procedures in the data entry process for mesh generation and the mesh correction process overlap.

As is described above, conventionally, processes are separately performed for each mesh even when many of procedures in the processes overlap. Thus, the working efficiency of the overall designing cycle is reduced.

A method called adaptive meshing is a generally known method for entering a generated mesh and outputting a mesh that has been modified as needed. According to adaptive meshing, the generation/changing of a mesh and finite element analysis are repetitively performed, and during these repetitions, the mesh is dynamically changed in accordance with the analysis results. For example, during the repetitive processing, a portion ascertained to be the one whereat stress is concentrated is divided using a finer mesh.

With the adaptive meshing method, analysis results obtained for a generated mesh can be reflected in a new generated mesh; however, a predetermined mesh can not be used in order to generate another mesh.

Therefore, for the generation for the same shape model of meshes having different characteristics, or for the generation for multiple similarly shaped models of a mesh having a common characteristic, the working efficiency can not be improved by skipping the overlapping processes.

It is, therefore, one object of the present invention to form a conventional mesh as a sample in order to efficiently generate a high-quality mesh for a predetermined shape model.

SUMMARY OF THE INVENTION

To achieve the above object, according to the present invention the following mesh generation system is provided. Specifically, a mesh generation system for generating a mesh used for finite element analysis comprises: a mesh characteristic extraction unit for receiving a conventional mesh and extracting a characteristic therefrom; and a mesh generator for receiving a target shape model for mesh generation, and for generating a mesh for the shape model based on the characteristic of the conventional mesh extracted by the mesh characteristic extraction unit.

The mesh characteristic extraction unit can extract the characteristic of the conventional mesh based on the geometrical characteristic of the elements of the conventional mesh.

The mesh characteristic extraction unit can extract the characteristic as a tensor field.

The mesh generation system further comprises: a mesh characteristic changing unit for changing the characteristic of the conventional mesh extracted by the mesh characteristic extraction unit, wherein the mesh generator generates a mesh based on the characteristic of the mesh changed by the mesh characteristic changing unit. Thus, the designer can change as desired the characteristic extracted in accordance with the finite element analysis type or the purpose for the analysis; for example, the designer can change the mesh size, the direction of the mesh, or the aspect ratio of the mesh elements.

The mesh generation system further comprises: a tensor field synthesization unit for synthesizing tensor fields describing multiple mesh characteristics extracted by the mesh characteristic extraction unit, wherein the mesh generator generates a mesh by using the tensor field obtained by the tensor field synthesization unit.

The tensor field synthesization unit may be provided as a function of the mesh characteristic extraction unit to synthesize tensor fields after the mesh characteristic is extracted, or may be provided as a function of the mesh characteristic changing unit to perform synthesization before the mesh characteristic is changed.

The mesh generation system further comprises: a tensor field extrapolation unit, for receiving a shape model for mesh generation and for extrapolating the tensor field that is extracted by the mesh characteristic extraction unit and that indicates the characteristic of the conventional mesh, so that the tensor field matches the shape model, wherein the mesh generator generates a mesh by using the tensor field obtained by the tensor field extrapolation unit.

According to the present invention, the following design support system is provided. Specifically, a design support system, for using a computer to support design, comprises: shape model preparation means for preparing a shape model; mesh generation means for employing a predetermined mesh as a sample for the generation of a mesh for the shape model; finite element analysis means for performing finite element analysis based on the mesh; and analysis result output means for displaying the analysis results on a display device.

More specifically, the mesh generation means extracts the characteristic of the predetermined mesh as a tensor field, and employs the characteristic to generate a mesh for the shape model.

According to the present invention, an analysis system, for performing finite element analysis of a predetermined shape model, comprises: mesh generation means for generating a mesh for a target shape model based on the characteristic of a predetermined mesh consonant with an analysis purpose; and finite element analysis means for performing a finite element analysis based on the obtained mesh.

The mesh generation means generates a mesh for the shape model based on the mesh characteristic represented as the tensor field.

According to the present invention, an analysis method for analyzing a characteristic of a predetermined mesh using a computer comprises the step of: extracting, at the least, a characteristic of an analysis target mesh as a tensor field.

During the actual analysis, an analysis method comprises the steps of: receiving a mesh to be analyzed; extracting the characteristic of the mesh as a tensor field; and outputting the characteristic of the mesh.

When the characteristic of the mesh is extracted as a tensor field, the mesh characteristic can be handled by the mathematical process.

More specifically, the step of extracting the characteristic of the mesh includes the steps of: calculating an inertia tensor for each of the elements of the mesh; and calculating an overall tensor field for the mesh based on the inertia tensor obtained for each of the elements.

According to the present invention, the following mesh generation method is provided. That is, a mesh generation method for generating a mesh used for finite element analysis comprises the steps of: extracting a characteristic from a conventional mesh; and generating a mesh for a predetermined shape model based on the extracted characteristic.

The step of extracting the characteristic includes the steps of: calculating the size of each of the elements of the conventional mesh; and employing the size of each of the elements to calculate a field describing the characteristic of the conventional mesh and corresponding to the overall conventional mesh.

Further, the step of extracting the characteristic may include the steps of: calculating not only the sizes of the elements of the conventional mesh, but also, for each of the elements, the direction of flow, and the size and the aspect ratio of an ellipse or of an ellipsoid, which are defined based on the elements; and employing the direction of flow, and the size and the aspect ratio of the ellipse or the ellipsoid to calculate a field describing the characteristic of the conventional mesh and corresponding to the overall conventional mesh.

The step of extracting the characteristic includes the steps of: calculating an inertia tensor for each of the elements of the conventional mesh; calculating a tensor field, based on the inertia tensor obtained for each of the elements, for the overall conventional mesh; and extrapolating the obtained tensor field, so that for mesh generation the tensor field matches the shape model. Instead of the extrapolating process used to match the shape model, the inertia tensor for each of the elements may be employed to directly calculate a tensor field that is extrapolated for the entire shape model.

According to the present invention, a storage medium can be provided wherein input means of a computer stores a computer-readable program, which permits the computer to perform: a process for extracting from a predetermined mesh a characteristic that matches the purpose of finite element analysis; and a process for generating for a predetermined shape model a mesh based on the characteristic extracted from the predetermined mesh.

Further, according to the present invention, a program transmission apparatus can be provided that comprises: storage means, for storing the above program; and transmission means, for reading the program from the storage means and transmitting the program.

The program also permits the computer to perform: a process for calculating a tensor field defined based on the elements of the predetermined mesh in order to extract the characteristic.

DESCRIPTION OF THE SYMBOLS

10, 20: Mesh generation system
11: Mesh characteristic extraction unit
12: Mesh characteristic change unit
13: Mesh generator
21: Tensor field extrapolation unit

[Preferred Embodiments]

The preferred embodiments of the present invention will now be described in detail while referring to the accompanying drawings.

An overview of the present invention will now given. In this invention, at the mesh generation process (step 2102) in the design cycle shown in FIG. 21, a conventional mesh is entered, and while this mesh is employed as a sample, another mesh for a shape model is generated and output. Hereinafter, the mesh used as a sample is called a template mesh.

Figure 1:
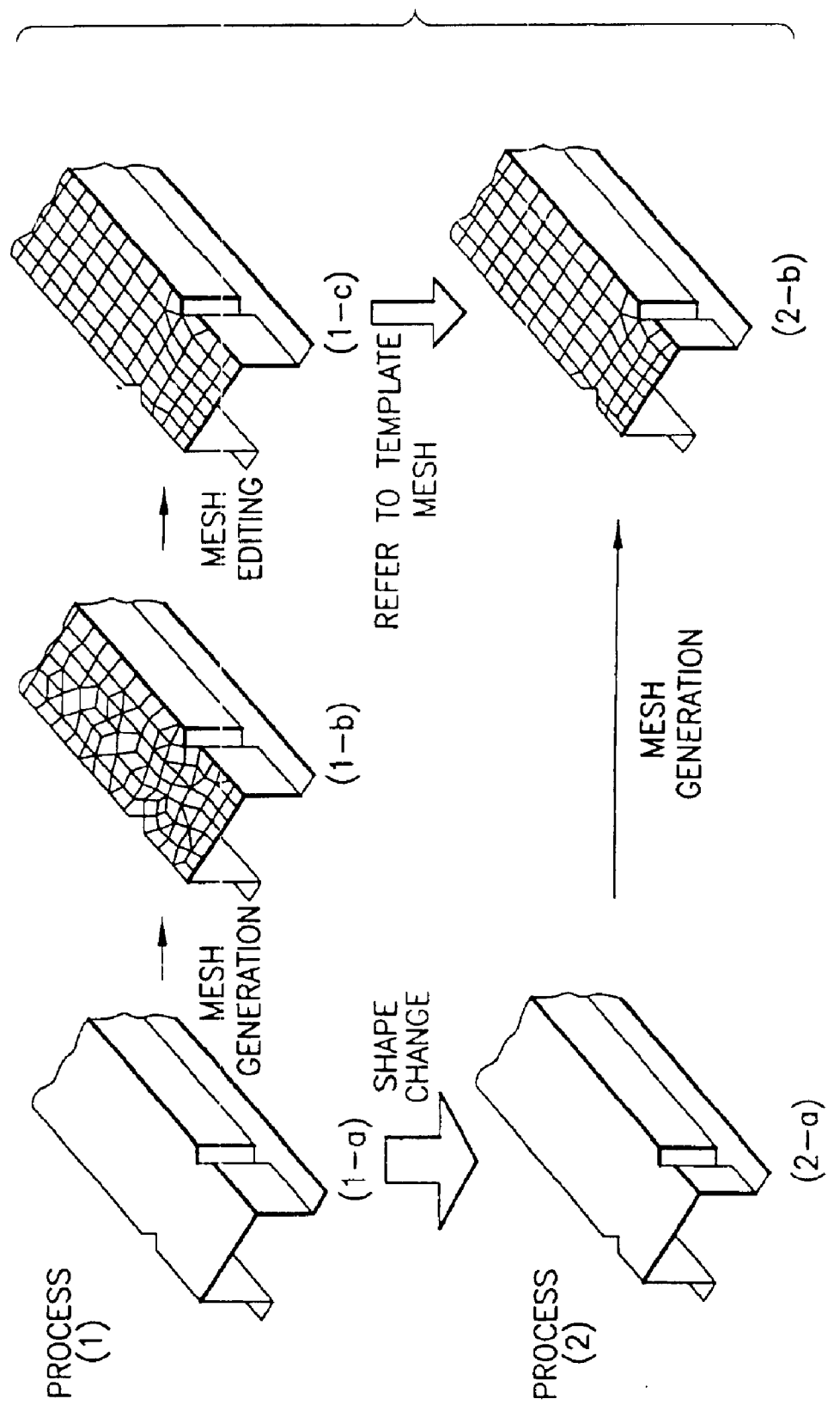
FIG. 1 is a diagram for explaining an example mesh generation process according to one embodiment of the present invention.
Figure 22:
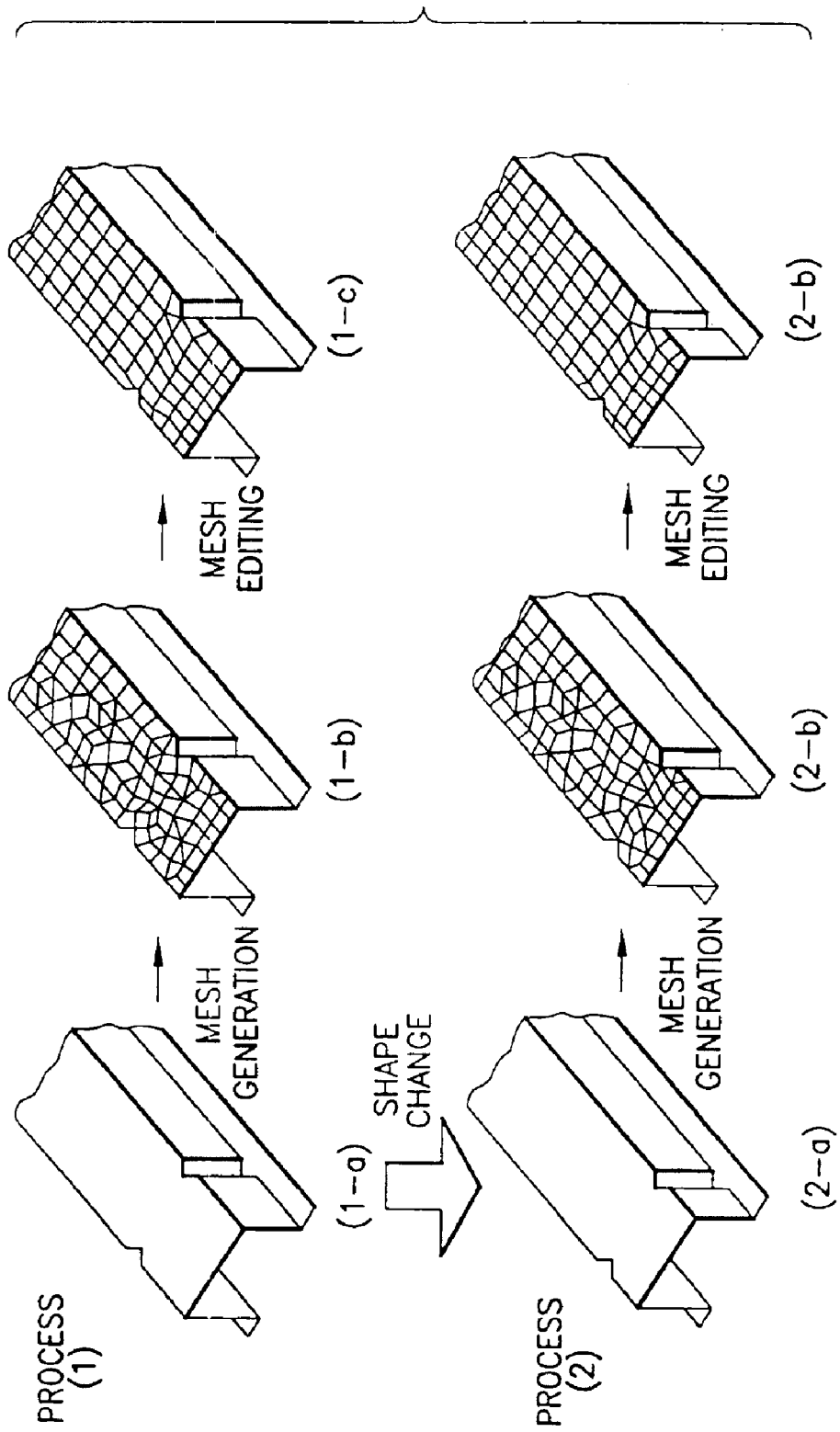
FIG. 22 is a diagram for explaining a conventional mesh generation process.

FIG. 1 is a diagram wherein the buckling problem in FIG. 22 is used for explaining an example mesh generation process according to the embodiment.

In FIG. 1, first, at step (1) a mesh (see (1-*b*)) that is automatically generated by the automatic mesh generation function of a CAD or CAE application is corrected manually, as needed, by a designer (see (1-*c*)). Since the intent of the designer is fully reflected in the thus obtained mesh, this mesh is used as a template mesh.

At step (2) a mesh is automatically generated by the CAD or CAE application for a shape differing from that at step (1). At this time, by referring to the template mesh generated at step (1), a mesh having the same characteristic as the template mesh can be automatically generated (see (2-b)). Therefore, the manual correction of the mesh in the state shown in (1-b) need not be performed again.

The template mesh and the mesh generated for this embodiment may be either two-dimensional or three-dimensional meshes. A two-dimensional mesh can be a triangular mesh constructed only of triangular elements, a quadrilateral mesh constructed only of quadrilateral elements, or a mixed quadrilateral mesh constructed mainly of quadrilateral elements and partially of triangular elements. A three-dimensional mesh can be a tetrahedral mesh constructed only of tetrahedral elements, a hexahedral mesh constructed only of hexahedral elements, or a mixed hexahedral mesh constructed mainly of hexahedral elements and partially of tetrahedral elements or pentahedral elements.

Figure 2:
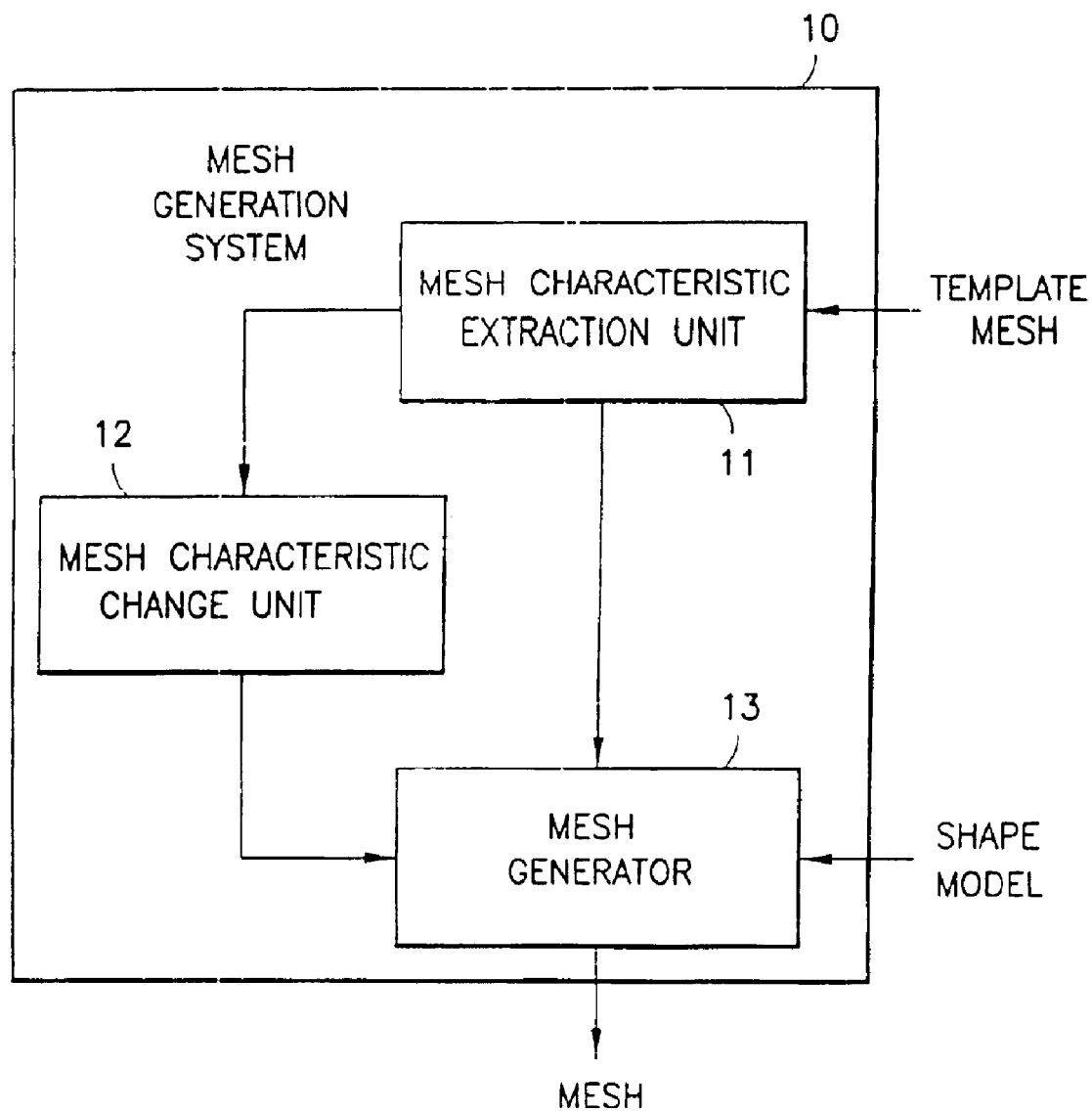
FIG. 2 is a diagram for explaining the general configuration of a mesh generation system according to the embodiment.

FIG. 2 is a diagram for explaining the general configuration of a mesh generation system according to the embodiment.

Figure 21:
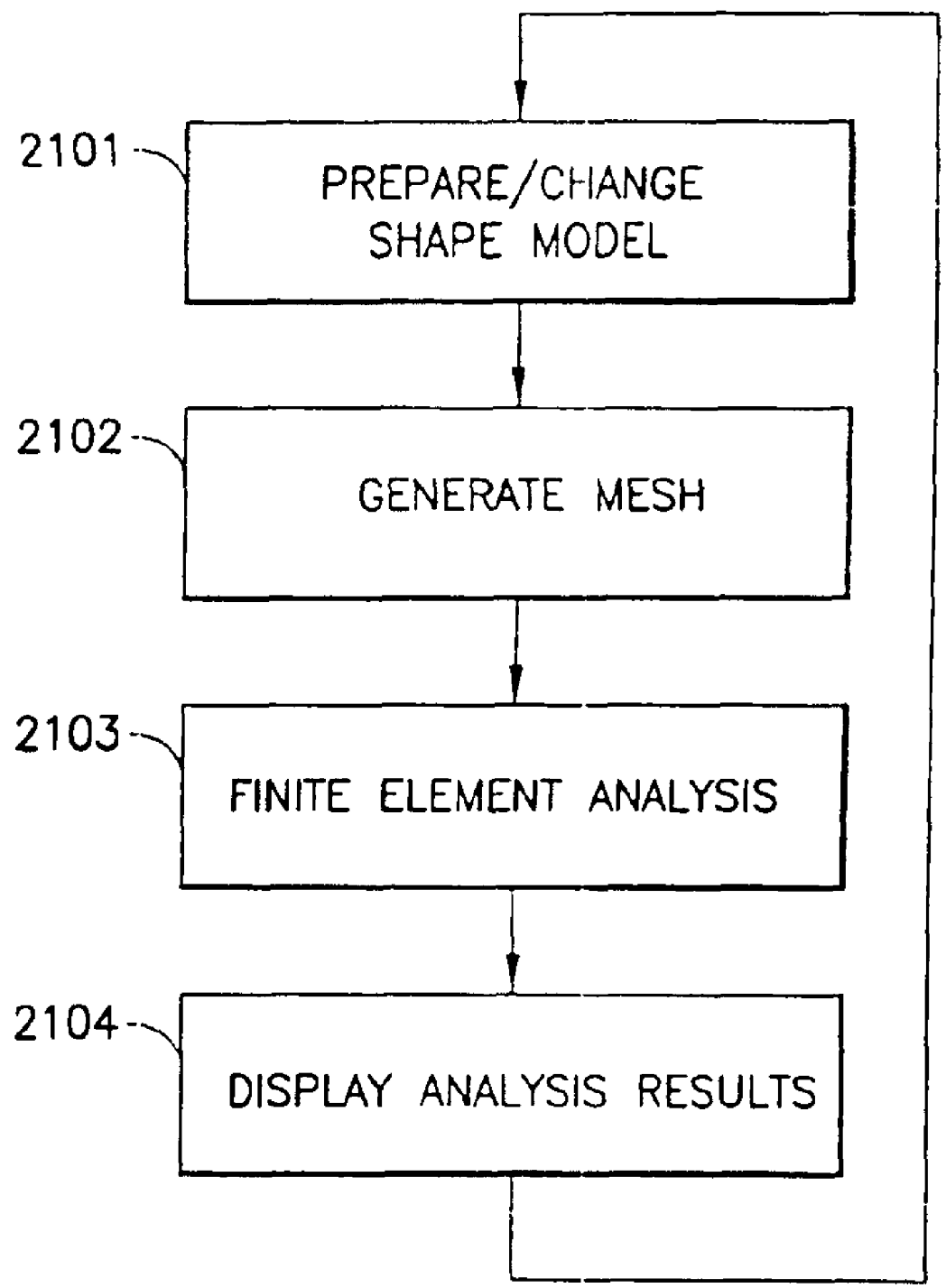
FIG. 21 is a flowchart for explaining the use of a computer for the design cycle in a manufacturing process.

A mesh generation system 10 in FIG. 2 is one part of a design support system, such as a CAD or CAE application, used as means for generating a mesh (step 2102) during a design cycle described in FIG. 21. Specifically, the mesh generation system 10 corresponds to the mesh generation means of a system that comprises: shape model preparation means, for preparing a target shape model; mesh generation means, for generating a mesh on the surface of the shape model; finite element analysis means, for performing finite element analysis based on the generated mesh; and analysis result output means, for displaying the analysis results on a display device. Further, for an analysis system for performing finite element analysis for a predetermined input shape model, the mesh generation system 10 can be used as means for generating, on the surface of a target shape model, a mesh for analysis. In FIG. 2, a mesh characteristic extraction unit 11 receives a conventional template mesh and extracts the characteristic therefrom. Then, based on the intent of a designer, a mesh characteristic change unit 12 changes the characteristic of the mesh extracted by the mesh characteristic extraction unit 11. And thereafter, a mesh generator 13 generates a mesh for a target shape model in accordance with the characteristic extracted by the mesh characteristic extraction unit 11, or as changed by the mesh characteristic change unit 12.

With this arrangement, the mesh characteristic extraction unit 11 extracts the characteristic from the template mesh. The mesh characteristic is a characteristic inherent to each mesh that is extracted based on the geometrical features and the correlation of the mesh elements. Various forms, such as a scalar field or a vector field, can be used to represent the mesh characteristic, and in this embodiment, it is represented as a tensor field.

The selection of a characteristic to be extracted need only be based on the information used for mesh generation by the mesh generator 13.

A two-dimensional tensor T is represented by equation 1, and space T(x,y), where the tensor T is defined at individual points in x-y two dimensional space, is called a two-dimensional tensor field.

[Equation 1]

$$T = \begin{bmatrix} Txx & Txy \\ Tyx & Tyy \end{bmatrix}, Txy = Tyx.$$

$$T(x, y) = \begin{bmatrix} Txx(x, y) & Txy(x, y) \\ Tyx(x, y) & Tyy(x, y) \end{bmatrix}, Txy(x, y) = Tyx(x, y).$$

Similarly, the three-dimensional tensor T is represented by equation 2, and space T(x,y,z), where the tensor T is defined at individual points in x-y-z three dimensional space, is called a three-dimensional tensor field.

[Equation 2]

$$T = \begin{bmatrix} Txx & Txy & Tyz \\ Tyx & Tyy & Tyz \\ Tzx & Tzy & Tzz \end{bmatrix}, Txy = Tyx, Tyz = Tzy, Tzx = Txz.$$

$$T(x, y, z) = \begin{bmatrix} Txx(x, y, z) & Txy(x, y, z) & Txz(x, y, z) \\ Tyx(x, y, z) & Tyy(x, y, z) & Tyz(x, y, z) \\ Tzx(x, y, z) & Tzy(x, y, z) & Tzz(x, y, z) \end{bmatrix},$$

$$Txy(x, y, z) = Tyx(x, y, z),$$

$$Tyz(x, y, z) = Tzy(x, y, z),$$

$$Tzx(x, y, z) = Txz(x, y, z).$$

Figure 3:
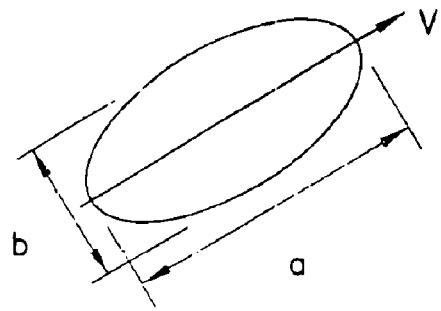
FIG. 3 is a diagram for explaining the elements used for specifying the characteristic of a mesh employed for the embodiment.

The tensor field can be interpreted as a space wherein an ellipse (two dimensions) or an ellipsoid (three dimensions) is defined at individual points in the space. In this embodiment, as is shown in FIG. 3, the direction along the long axis of the ellipse (or the ellipsoid) is called the direction of flow, the radius along the long axis of the ellipse (or the ellipsoid) is called the mesh size, and the numerical value obtained by dividing the radius along the short axis of the ellipse by the radius along the long axis is called the aspect ratio. It should be noted that when an arbitrary rule is determined in advance, the direction along the long axis, which is called the direction of flow, can be specified. The tensor field in this embodiment includes a compressional field for providing only the mesh size. When the ellipses defined by the tensor field are all circles (or the ellipsoids defined in the three-dimensional space are all spheres), no direction of flow (scalar field) is present in the tensor, and its radius is defined as the compressional field for determining the mesh size.

In this embodiment, it should be noted that the tensor is calculated for each node of a mesh, and tensors for the other positions are calculated by using the tensor for each node, as needed.

Figure 4:
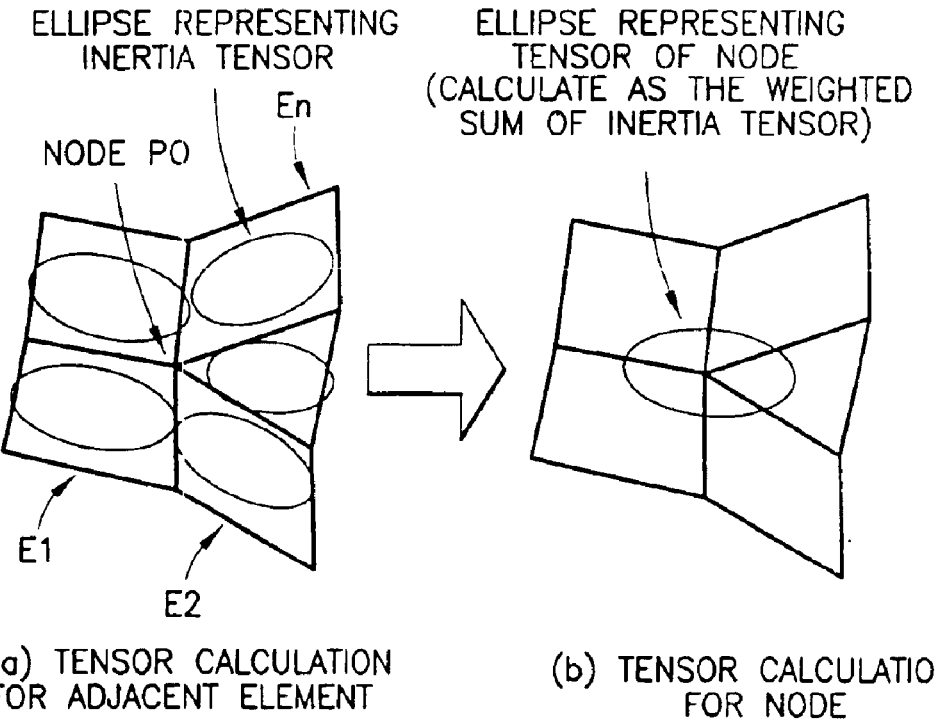
FIG. 4 is a diagram for explaining the method for calculating a tensor for a node of a mesh used for the embodiment.

FIG. 4 is a diagram for explaining a method used for calculating the tensor for a node.

In FIG. 4, calculation of the tensor at node P0 is based on nearby elements (the elements are triangular, quadrilateral, tetrahedral and hexahedral). This calculation method will be specifically explained. Assume that elements E1, E2, . . . and En are adjacent to the node P0, which means that the node P0 is included as a constituent node of the element Ei (i=1, 2, . . . n). Thus, when the adjacent elements are two-dimensional, the tensor T1 of the element E1 is calculated by solving equation 3.

[Equation 3]

$$T1 = \begin{bmatrix} Ixx & Ixy \\ Iyx & Iyy \end{bmatrix},$$

-continued $$Ixx = \int y^2 dA,$$

$$Iyy = \int x^2 dA,$$

$$Ixy = Iyz = -\int xy dA,$$

where $\int dA$ represents the surface integral for the overall element.

And when the adjacent elements are three-dimensional, the tensor T1 of the element E1 is obtained by solving equation 4.
[Equation 4]

$$T1 = \begin{bmatrix} Ixx & Ixy & Ixz \\ Iyx & Iyy & Iyz \\ Izx & Izy & Izz \end{bmatrix},$$

$$Ixx = \int (y^2 + z^2) dV,$$

$$Iyy = \int (z^2 + x^2) dV,$$

$$Izz = \int (x^2 + y^2) dV,$$

$$Ixy = Iyx = -\int xy dV,$$

$$Iyz = Izy = -\int yz dV,$$

$$Izx = Ixz = -\int zx dV,$$

where $\int dV$ represents the integral for the overall element.

The above calculations are those used for calculating the inertia tensor for the element E1. Similarly, for the other elements E2 to En, equation 3 or 4 is used to calculate the tensors T2 to Tn. The thus obtained tensors T1 to Tn are then employed in equation 5 to calculate the tensor T0 at the node P0.

$$T0=(w1T1+w2T2+\ldots+wnTn)/(w1+w2+\ldots+wn) \quad \text{[Equation 5]}$$

Equation 5 is solved to calculate the weighting sum. The weighting coefficient wi (i=1, 2, ... n) is calculated by using the node P0 and the gravity center Pi of the element Ei to solve equation 6.

$$wi=1/\|P0-Pi\|, \text{or}$$

$$Wi=1/\|P0-Pi\|^2. \quad \text{[Equation 6]}$$

The tensor at the node P0 is obtained in the above described manner. In the same manner, tensors are calculated for all the other nodes in the template mesh. Using the above calculation methods, the elements E1 to En, which are adjacent to the node P0, are employed to calculate the tensor at the node P0. The adjacent elements are those sharing the node, or an edge, with a predetermined element. An element group including not only the elements E1 to En but also additional adjacent elements may be employed to calculate the tensor at the node P0. In addition, instead of calculating the tensor at the node P0, the inertia tensors at the elements E1 to En may be directly employed to define the tensor field of the template mesh.

The mesh characteristic change unit 12 changes a tensor field that represents the mesh characteristic extracted by the mesh characteristic extraction unit 11. When the coordinate transform matrix is defined as A and a transpose of its matrix is defined as $A^t$, the tensor transform can be calculated by multiplying the matrixes in equation 7.

$$T'=ATA^t \quad \text{[Equation 7]}$$

This tensor transform can be so interpreted that a specific ellipse (ellipsoid) can be transformed into another ellipse (ellipsoid) without its center being moved. The mesh characteristic change unit 12 performs a tensor transform in equation 7 for each point in the space the template mesh occupies. Specifically, as in equation 8, the coordinate transform matrix A is multiplied by the tensor field T, extracted from the template mesh, to generate a new tensor field T'.

$$T'(x,y)=A(x,y)T(x,y)A(x,y)^t \text{ (two dimensional case)}$$

$$T'(x,y,z)=A(x,y,z)T(x,y,z)A(x,y,z)^t \text{ (three dimensional case)} \quad \text{[Equation 8]}$$

The provision of the tensor is the equivalent of the provision of the direction of flow, the mesh size and the aspect ratio of the ellipse (ellipsoid) in FIG. 3 for the pertinent tensor. Therefore, the direction of flow, the mesh size and the aspect ratio are changed in the tensor field change process performed by the mesh characteristic change unit 12.

Figure 5:
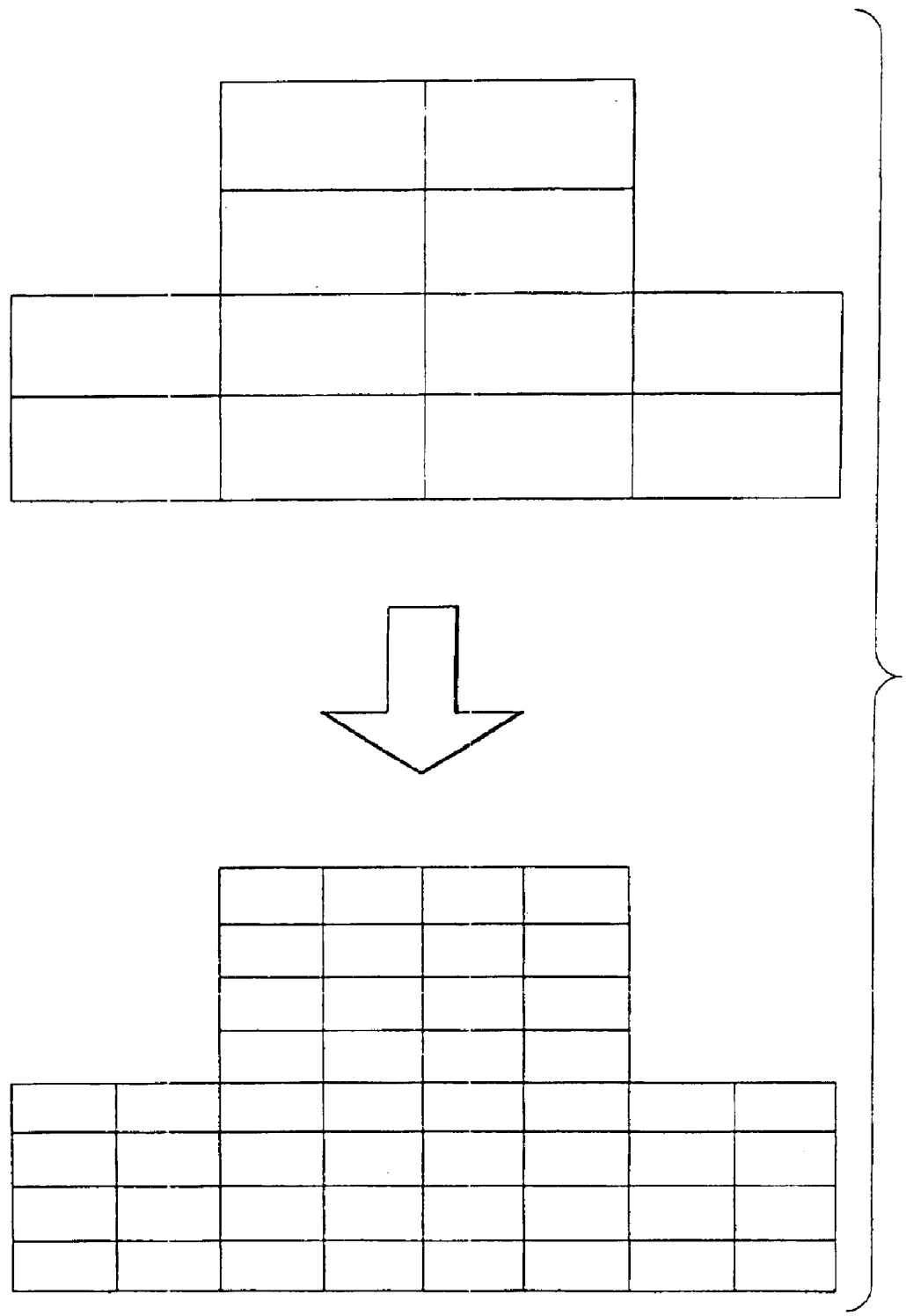
FIG. 5 is a diagram showing an example mesh characteristic transform process, according to the embodiment, for changing the mesh size while leaving the direction of flow and the aspect ratio unchanged.

A typical example transform will now be explained. FIG. 5 is a diagram of a transform process whereby the mesh size is changed while the direction of flow and the aspect ratio are not. This transform is effective for an analysis using a mesh having different finenesses. For this transform, the following matrix $A_1$ is provided as the coordinate transform matrix A in equation 8.
[Equation 9]

$$A_1(x, y) = \begin{bmatrix} k(x, y) & 0 \\ 0 & k(x, y) \end{bmatrix},$$

where k(x,y) represents a real number value. For example, when the mesh size is uniformly expanded "a" times, only k(x,y)=1/a need be substituted into equation 9.

Figure 6:
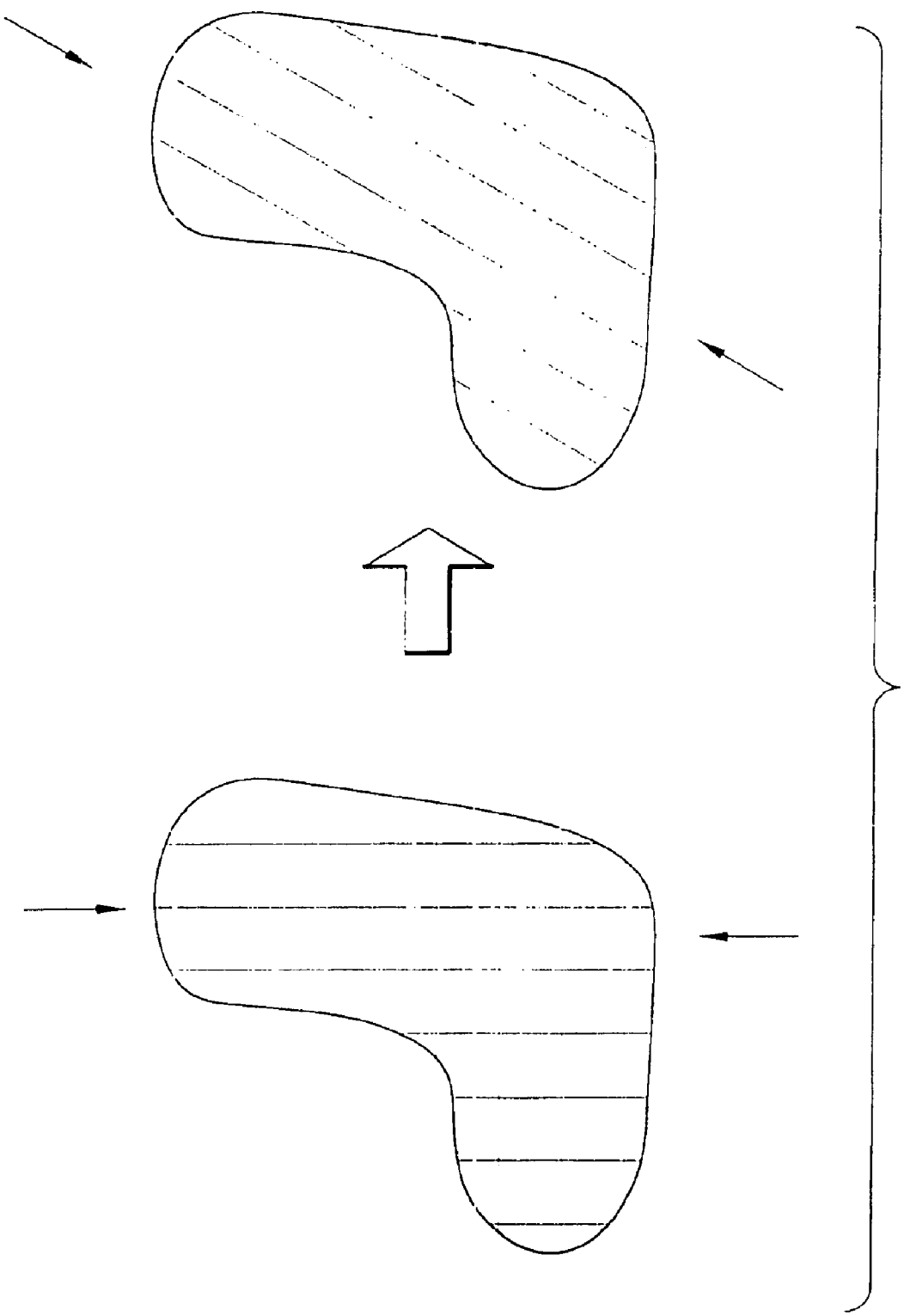
FIG. 6 is a diagram showing another example mesh characteristic transform process, according to the embodiment, for changing the direction of flow while leaving the mesh size and the aspect ratio unchanged.

FIG. 6 is a diagram showing the transform process whereby the direction of flow is changed while the mesh size and the aspect ratio are not. This transform is effective for an analysis, such as a collision analysis, for which the direction of flow of the mesh is important, and when the strength of collisions for several different directions are analyzed. For this transform, the following matrix $A_2$ is used as the coordinate transform matrix A in equation 8.
[Equation 10]

$$A_2(x, y) = \begin{bmatrix} \cos a(x, y) & -\sin a(x, y) \\ \sin a(x, y) & \cos a(x, y) \end{bmatrix},$$

where a(x,y) denotes a real number value representing the rotational angle.

For example, when there is a uniform 30 degree change in the direction of flow (there is a 30 degree change in the direction of the entire mesh), only 30 need be substituted into equation 10 as a value for a(x,y).

Figure 7:
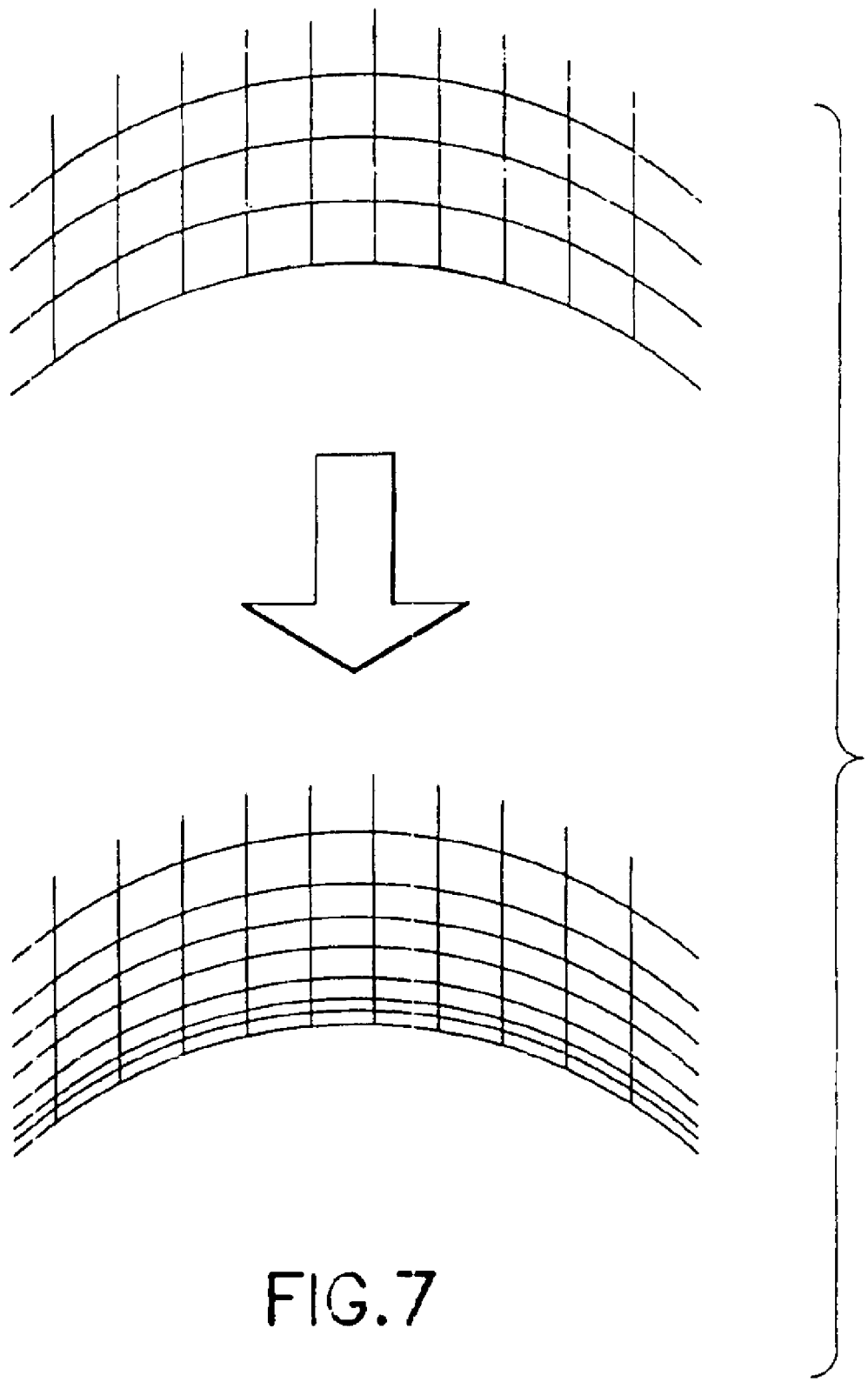
FIG. 7 is a diagram showing an additional example mesh characteristic transform process, according to the embodiment, for changing the aspect ratio while leaving the direction of flow and the mesh size unchanged.

FIG. 7 is a diagram showing the transform process whereby the aspect ratio is changed while the direction of flow and the mesh size are not. This process is effective, for example, for the hydraulic analysis of the periphery of a wing, at which time it is performed accurately only in a specific direction. For this transform, the following matrix $A_3$ is used as the coordinate transform matrix A in equation 8.

$$A_3(x,y) = BKB^t,$$ [Equation 11]

$$K = \begin{bmatrix} k_1(x,y) & 0 \\ 0 & k_2(x,y) \end{bmatrix},$$

where $k_1(x,y)$ and $k_2(x,y)$ represent real number values.

Further, matrix B appears when the tensor T in equation 3 is decomposed as follows.

$$T(x,y) = BRB^t,$$

$$B = \begin{bmatrix} \cos b(x,y) & -\sin b(x,y) \\ \sin b(x,y) & \cos b(x,y) \end{bmatrix},$$

$$R = \begin{bmatrix} 1/r_1(x,y) & 0 \\ 0 & 1/r_2(x,y) \end{bmatrix},$$

where $b(x,y)$, $r_1(x,y)$ and $r_2(x,y)$ represent real number values.

For example, to uniformly increase the aspect ratio "a" times, only $k_1=1$ and $k_2=1/a$ need be substituted in when $r_1 > r_2$, or only $k_1=1/a$ and $k_2=1$ need be substituted in when $r_1 \leq r_2$.

Figure 8:
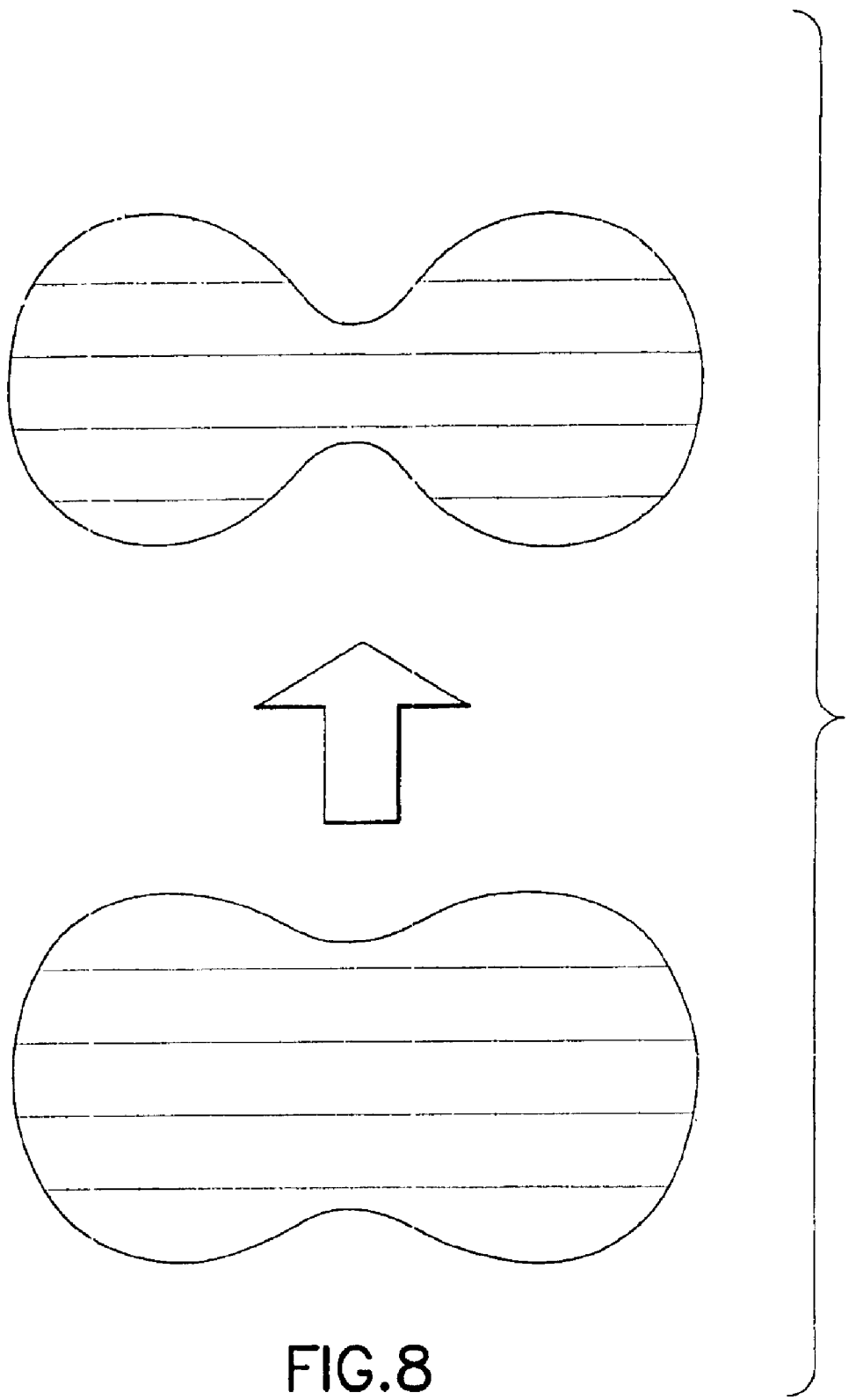
FIG. 8 is a diagram showing an additional example mesh characteristic transform process, according to the embodiment, used for a different shape model while leaving the direction of flow, the mesh size and the aspect ratio unchanged.

FIG. 8 is a diagram showing an example wherein although the direction of flow, the mesh size and the aspect ratio are unchanged, they are used for a different shape model. Conversely, to change the direction of flow, the mesh size and the aspect ratio at the same time, the following matrix $A_4$ is used as the coordinate transform matrix A in equation 8.

$$A_4(x,y) = A_2(x,y)A_3(x,y)$$ [Equation 12]

The mesh generator 13 generates a mesh for a target shape model based on a tensor field representing a mesh characteristic obtained by the mesh characteristic extraction unit 11 and the mesh characteristic change unit 12. Specifically, for the individual points in the space wherein mesh generation is required, mesh generation is performed to generate as many elements as possible that employ as the inertia tensor the tensor obtained by the mesh characteristic extraction unit 11 and the mesh characteristic change unit 12. The conventional, common method can be employed to generate a mesh; and even when the advancing front method is employed for mesh generation, only the distance and the direction in which the front advances need be determined in accordance with the tensor field, so that a mesh can be generated that is as consonant as possible with the tensor field.

Figure 9:
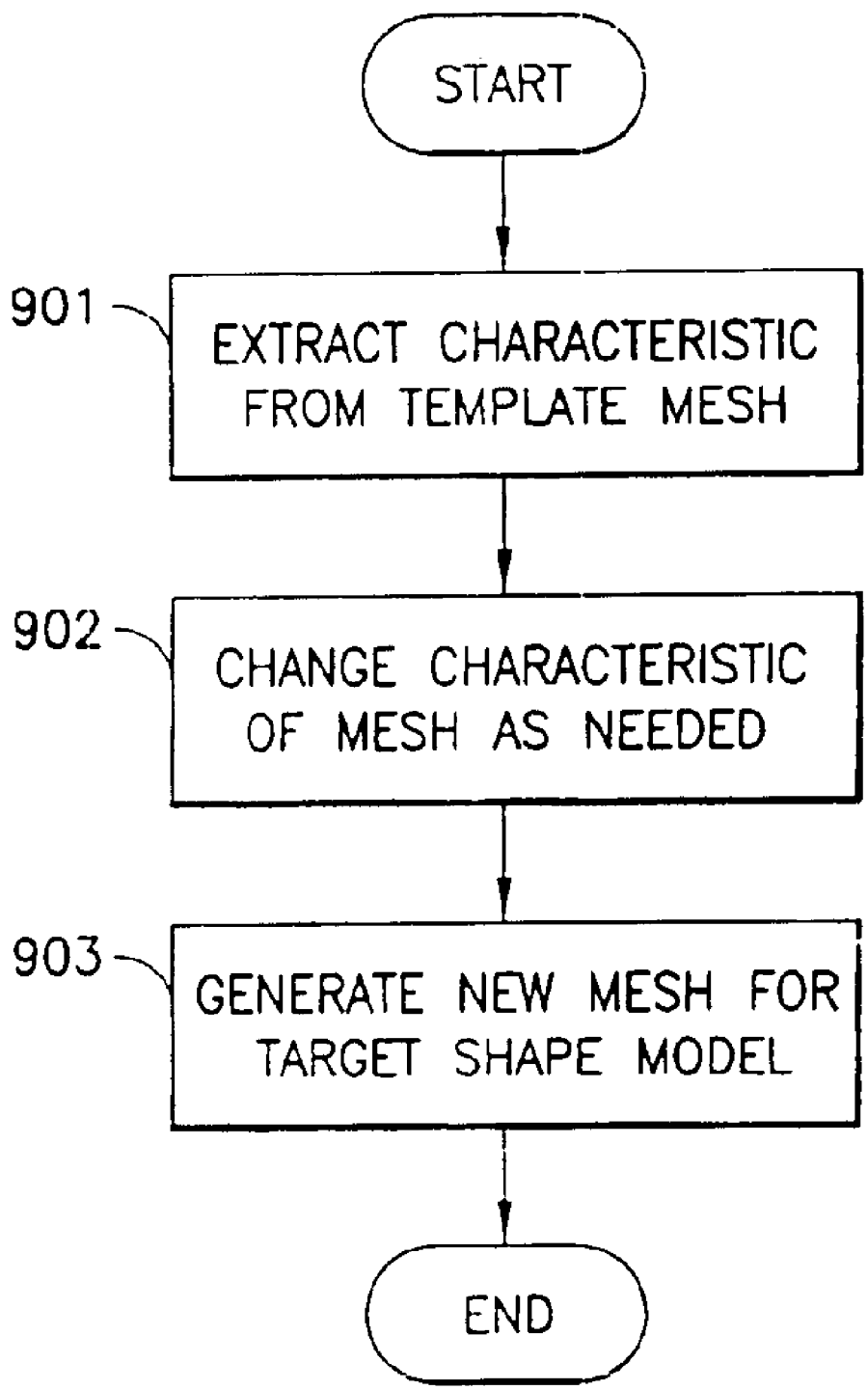
FIG. 9 is a flowchart showing the processing performed by the mesh generation system according to the embodiment.

FIG. 9 is a flowchart showing the processing performed by the mesh generation system 10 according to the embodiment.

In FIG. 9, in this embodiment, first, the mesh characteristic extraction unit 11 enters the template mesh and extracts, in the form of a tensor field, the characteristic of the template mesh (step 901).

Following this, the mesh characteristic change unit 12 changes, as needed, the mesh characteristic that is extracted in the form of a tensor field by the mesh characteristic extraction unit 11 (step 902). During this process, in accordance with the intent of a designer, the mesh size, the direction of flow of the elements and the shapes of mesh elements (the aspect ratio) are changed. As is described above, when the characteristic of the mesh is extracted in the form of a tensor field, the mesh characteristic can be changed by using a mathematical operation.

It should be noted that a mesh characteristic is changed when a designer considers it necessary in order to obtain a new, higher-quality mesh. Therefore, when a characteristic extracted from a template mesh is to be used unchanged for the generation of a new mesh, the characteristic change process need not be performed by the mesh characteristic change unit 12.

Finally, based on the tensor field that is obtained through a predetermined change effected by the mesh characteristic change unit 12 (or, when no change is effected, the tensor field extracted by the mesh characteristic extraction unit 11), the mesh generator 13 generates a new mesh for a target shape model (step 903). Thereinafter, the obtained mesh is employed in the design cycle in FIG. 21 to perform finite element analysis (step 2103).

As is described above, the mesh generation system 10 of this embodiment employs an arbitrary template mesh as a sample when generating a new mesh for a shape model. Thus, a mesh can be generated that has a characteristic that is the same as or is similar to that of the template mesh. And therefore, when a mesh that fully reflects the intent of a designer is selected as a template mesh, a high-quality mesh that also fully reflects the intent of the designer can be automatically generated.

Generally, a calculation time of from several seconds to less than twenty seconds is required for the automatic mesh generation function of a CAD or CAE application to generate a mesh, while a time of from several minutes to less than twenty minutes is required to enter necessary data or to correct a mesh. In this embodiment, since correction and data input operations can be eliminated, a considerable reduction in processing time can be realized. Especially for the repetitious generation for one shape model of meshes having various characteristics, template meshes having desired characteristics need only be sequentially input. Therefore, since meshes that are mechanically and uniformly, automatically generated need not be separately corrected in accordance with desired characteristics, there is a dramatic improvement in work efficiency.

Also, if necessary, further manual correction of a generated mesh can be used to obtain a higher-quality mesh.

In addition, a determination as to whether a specific mesh is a high-quality mesh may differ, depending on which operation (e.g., simulation) is to be performed for the shape model for which the pertinent mesh was generated. Therefore, if a higher-quality mesh than the mesh used as a template mesh, i.e., a mesh with which satisfactory results can be obtained, is generated, this mesh can thereafter be used as the template mesh.

Figure 10:
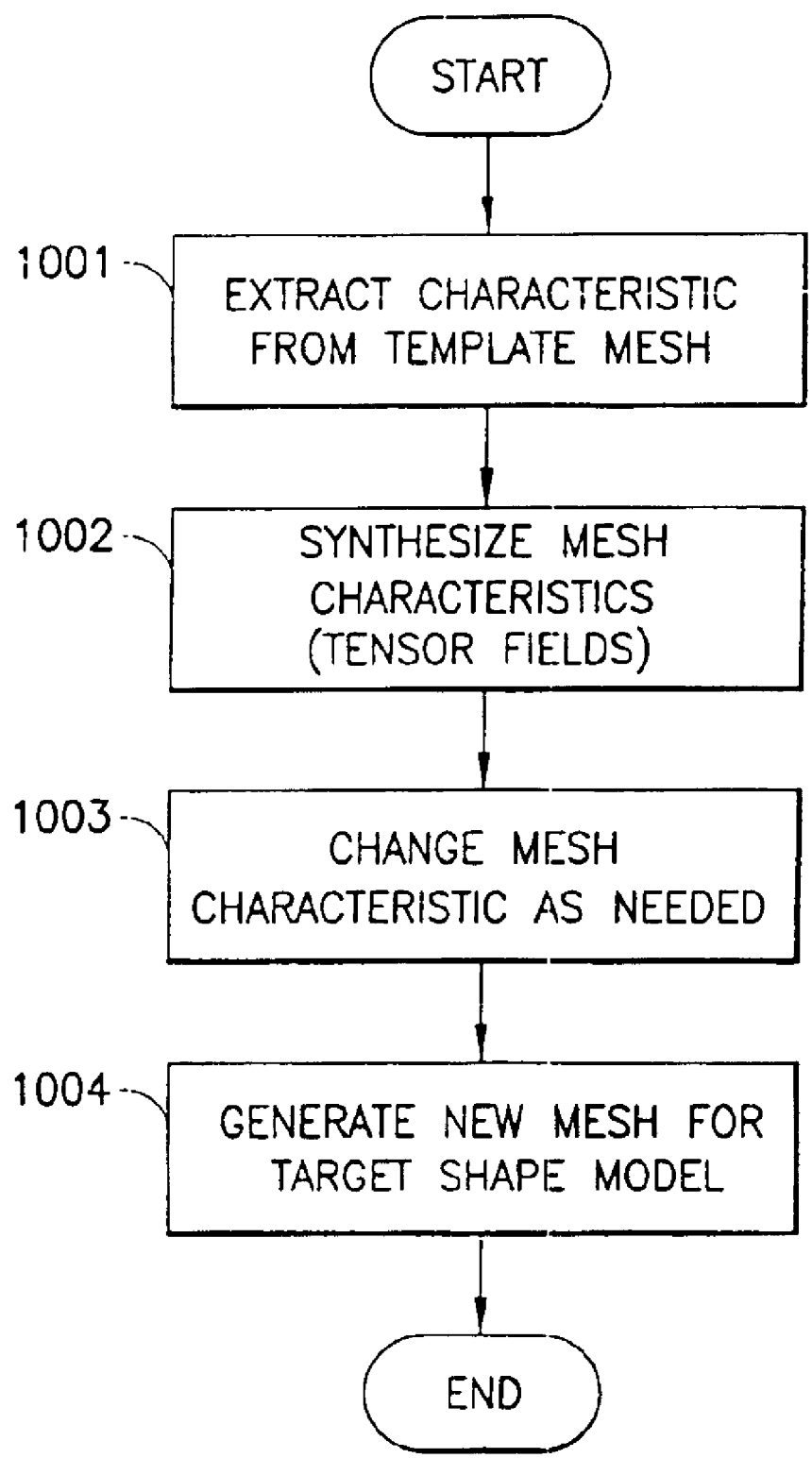
FIG. 10 is a flowchart showing the processing, according to the embodiment, for generating a new mesh using multiple template meshes.

In the explanation, the number of template meshes is not specifically designated; however, in this embodiment, multiple template meshes can be entered and employed to generate a mesh having an intermediate characteristic. FIG. 10 is a flowchart showing the processing for generating a new mesh using multiple template meshes.

In FIG. 10, first, the mesh characteristic extraction unit 11 receives multiple template meshes, and extracts characteristics from them as tensor fields (step 1001). The multiple extracted tensor fields are then synthesized to generate a new tensor field (step 1002).

The tensor synthesization process will now be described in detail.

Assume that the tensor fields obtained from the template meshes $M_i$ ($i=1, 2, \ldots, n$) are denoted as $T_i$ ($i=1, 2, \ldots,$ n). Further, assume that a tensor field produced by the synthesization process is denoted as T' and a mesh that is generated which is based on the tensor field T' is denoted as M'.

The tensor synthesization process includes the two following processes:

process 1: generate or select the mesh M'.
process 2: employ tensor field Ti (i=1, 2, . . . , n) to calculate a tensor for each node of the mesh M'.

For process 1, either a method is used that provides for the extraction of nodes from all the template meshes Mi (i=1, 2, . . . , n) and for the generation of the mesh M' that connects the nodes, or a method is used that provides for one of the template meshes Mi (i=1, 2, . . . , n) to be selected as the mesh M'.

For process 2, the following calculation, which is used to obtain the tensor T0 for a predetermined node P0 in the mesh M', is performed for all the nodes of the mesh M'. First, an element in a template mesh M1 that includes the node P0 is determined and is denoted as an element E1. Then, the nodes Pj (j=1, 2, . . . , m1), which form the element E1, are calculated. Since the tensors for the nodes Pj (j=1, 2, . . . , m1) have already been obtained, the tensors are denoted as Tj (j=1, 2, . . . , m1). Thereafter, tensor field T01 for the node P0 is calculated by solving equation 13 while employing the template mesh M1 for the node P0.

$$T01=(w1T1+w2T2+ \ldots +wrTm1)/(w1+w2+ \ldots +wm1) \quad \text{[Equation 13]}$$

The weighting coefficient wj (j=1, 2, . . . , m1) in equation 13 is calculated by employing the nodes P0 and Pj (j=1, 2, . . . m1) to solve equation 14.

$$wj=1/\|P0-Pj\|, \text{ or}$$

$$wj=1/\|P0-Pj\|^2. \quad \text{[Equation 14]}$$

In the same manner as the tensor field T01 was calculated while the template mesh Ml was used for the node P0, the tensor fields T0i (i=1, 2, . . . n) are calculated using all the meshes Mi (i=1, 2, . . . , n). Based on the thus obtained tensor fields T0i (i=1, 2, . . . , n), equation 15 is used to calculate the tensor T0 for the node P0.

$$T0=(u1T01+u2T02+ \ldots +unT0)/(u1+u2+ \ldots +un) \quad \text{[Equation 15]}$$

The weighting coefficient ui in equation 15 represents a ratio for the mixing of the tensor fields T01 (i=1, 2, . . . , n) for the meshes. For example, to mix all the template meshes at the same ratio, the same numerical value is used for ui (i=1, 2, . . . , n).

Since the change in the characteristic of the tensor field (step 1003) and the mesh generation (step 1004) in FIG. 10 are the same as those at steps 902 and 903 in FIG. 9, no explanation for them will be given. In the processing in FIG. 10, the mesh characteristic extraction unit 11 synthesizes the tensor fields extracted from multiple meshes. However, the mesh characteristic extraction unit 11 may merely extract the tensor fields and transmit them to the mesh characteristic change unit 12, and before the mesh alteration based on the intent of the designer is performed, the mesh characteristic change unit 12 may synthesize the tensor fields received from the mesh characteristic extraction unit 11.

Another embodiment of the present invention will now be described.

Figure 11:
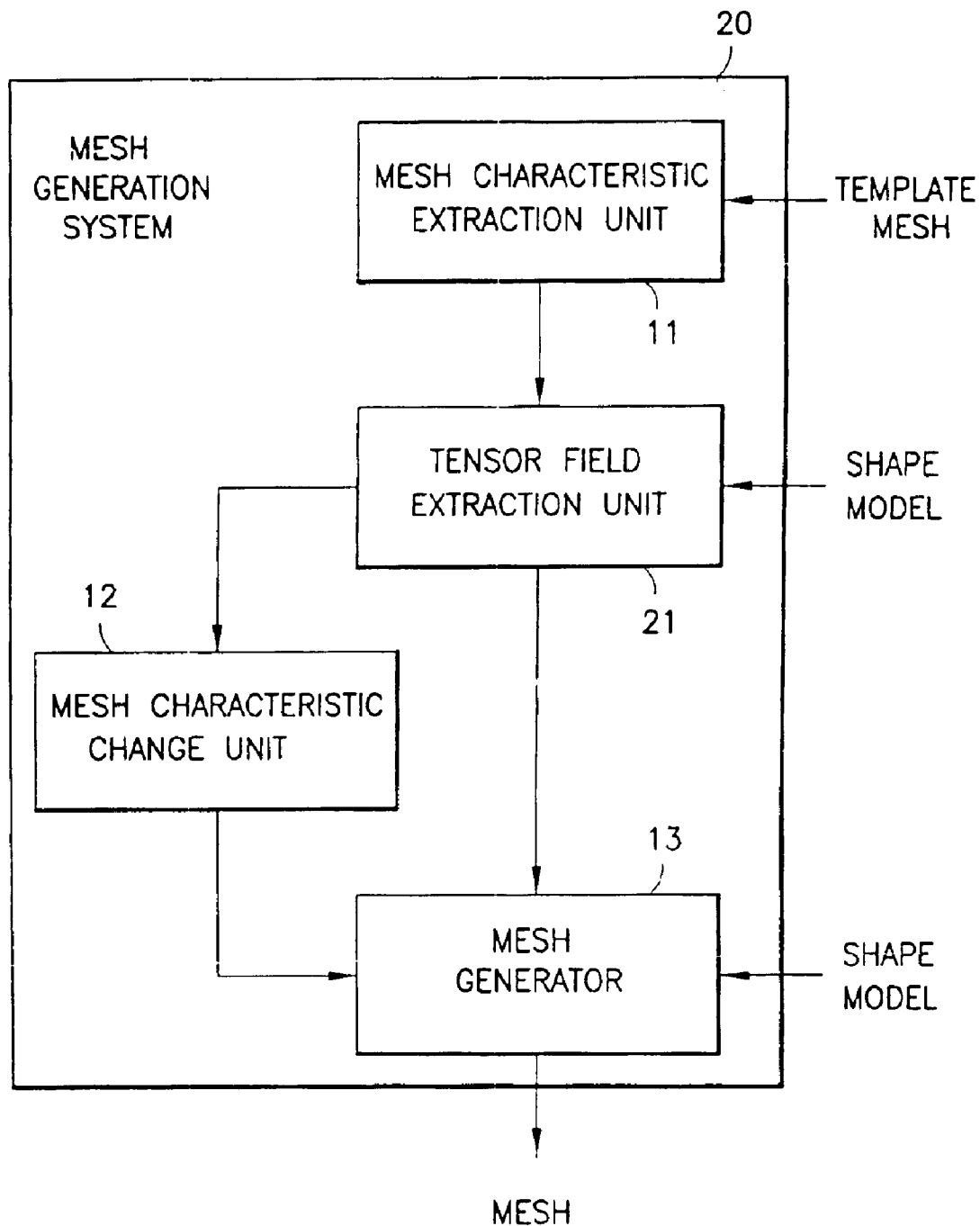
FIG. 11 is a diagram for explaining the general configuration of a mesh generation system according to another embodiment.
Figure 12A:
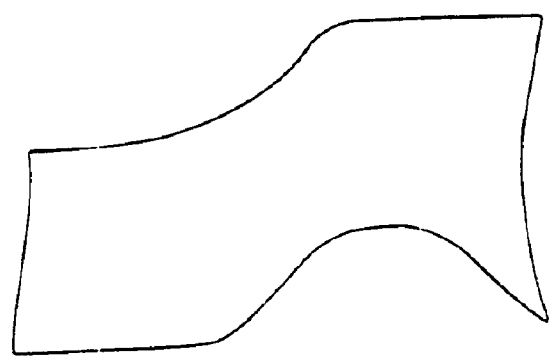
FIG. 12 is a diagram for a mesh generation example, according to the embodiment, for generating a mesh while leaving a tensor field extracted from a template mesh unchanged.
Figure 12B:
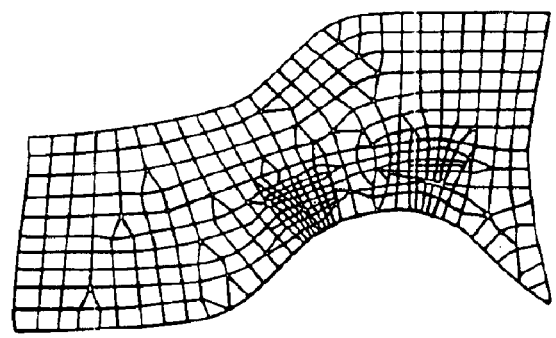
Figure 12C:
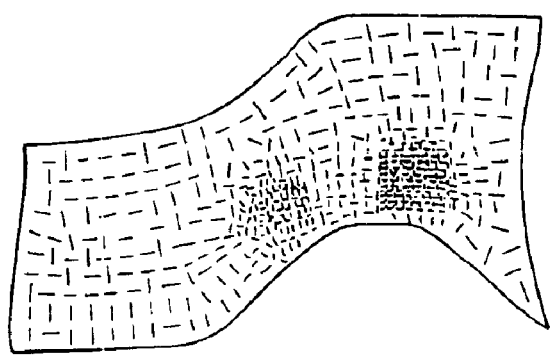
Figure 12D:
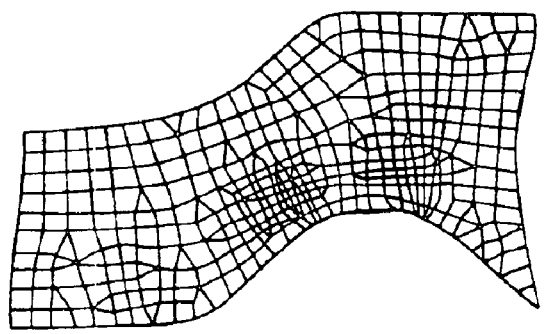
Figure 13A:
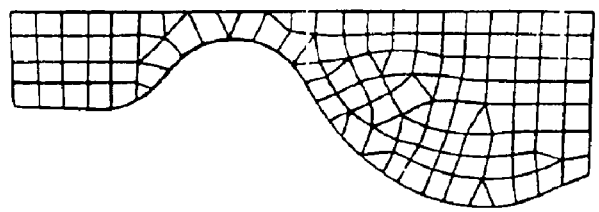
FIG. 13 is a diagram for another mesh generation example, according to the embodiment, for generating, for the same shape model, several types of different size meshes having the same characteristic.
Figure 13B:
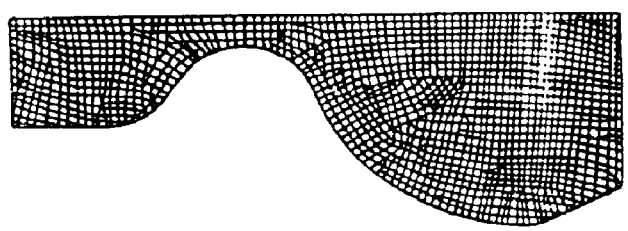
Figure 13C:
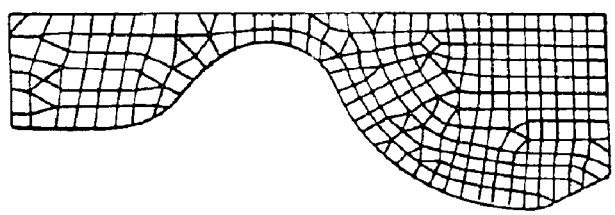
Figure 13D:
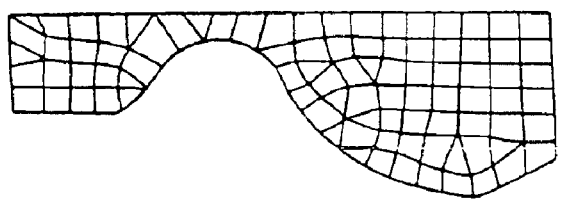
Figure 13E:
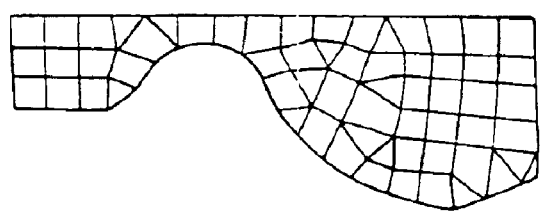
Figure 13F:
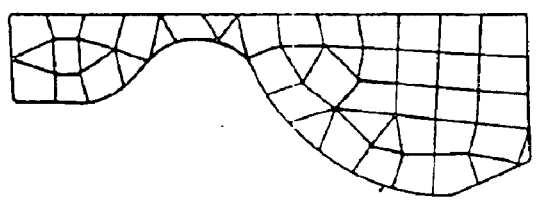
Figure 14A:
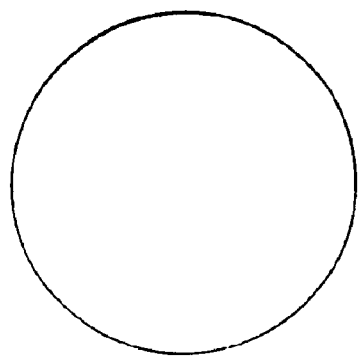
FIG. 14 is a diagram for a mesh generation example accompanying the extrapolation of a tensor field, according to the embodiment, for generating a mesh for a quadrilateral share model by using, as a template mesh, a mesh generated for a circular shape model.
Figure 14B:
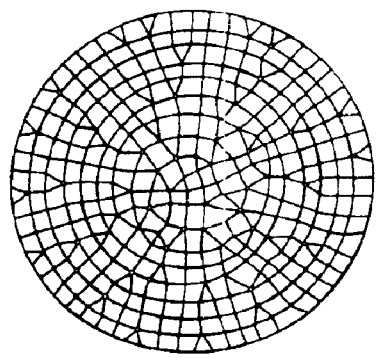
Figure 14C:
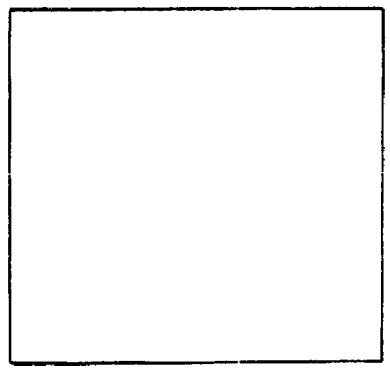
Figure 14D:
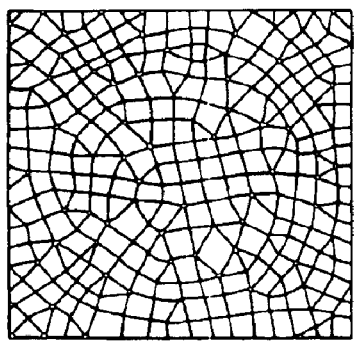
Figure 15A:
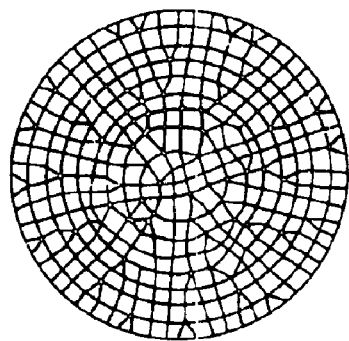
FIG. 15 is a diagram for explaining the process for generating a mesh using a tensor field extracted from a template mesh in FIG. 14.
Figure 15B:
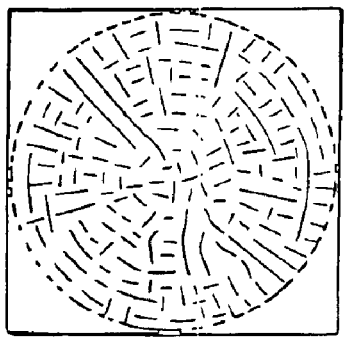
Figure 15C:
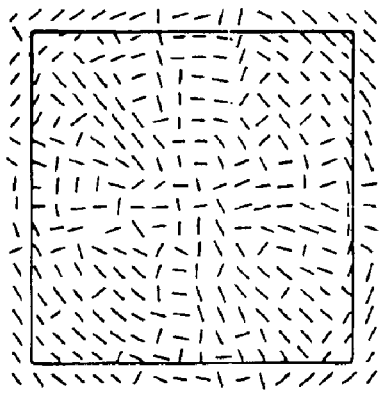
Figure 15D:
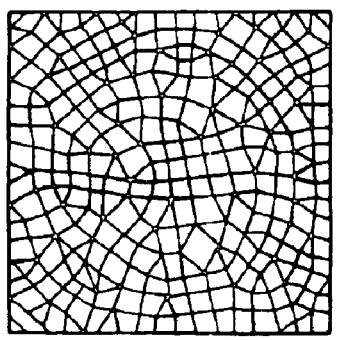
Figure 16A:
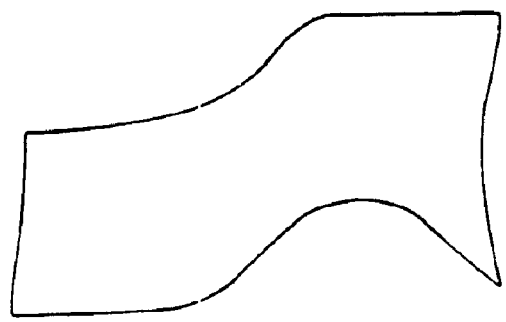
FIG. 16 is a diagram for another mesh generation example accompanying the extrapolation of a tensor field, according to the embodiment, for generating a mesh for a rectangular shape model by using a template mesh extracted from a predetermined shape model.
Figure 16B:
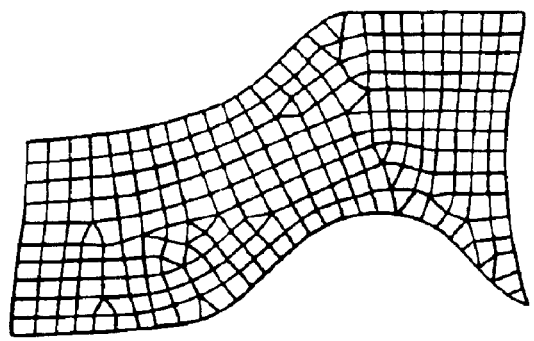
Figure 16C:
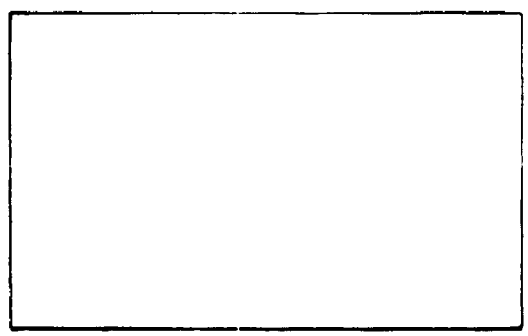
Figure 16D:
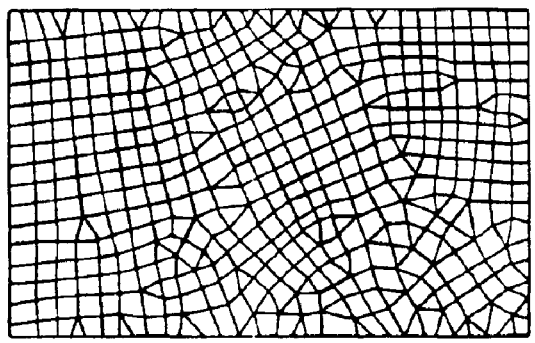
Figure 17A:
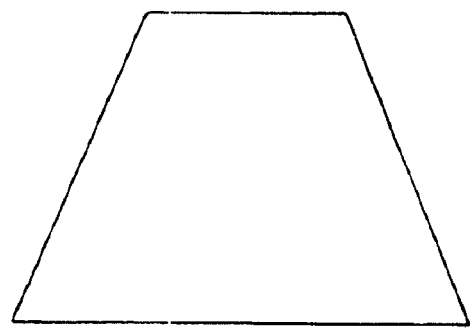
FIG. 17 is a diagram for an additional mesh generation example accompanying the extrapolation of a tensor field, according to the embodiment, for generating a mesh for a rectangular shape model by using a template mesh extracted from another predetermined share model.
Figure 17B:
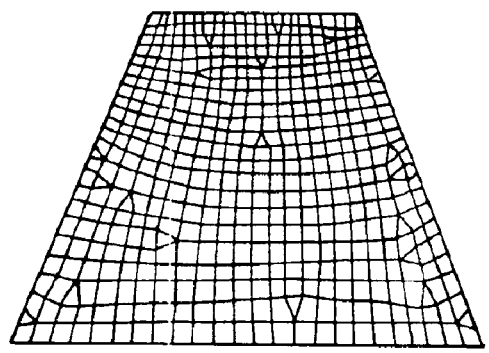
Figure 17C:
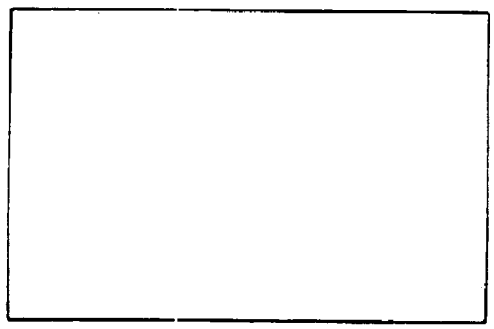
Figure 17D:
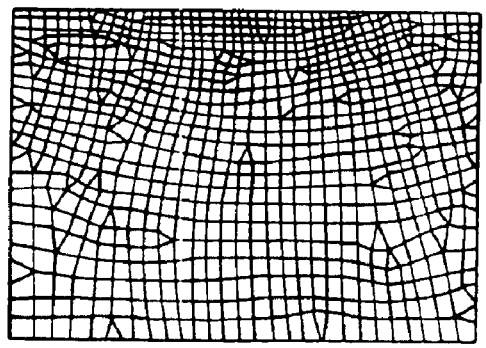
Figure 18A:
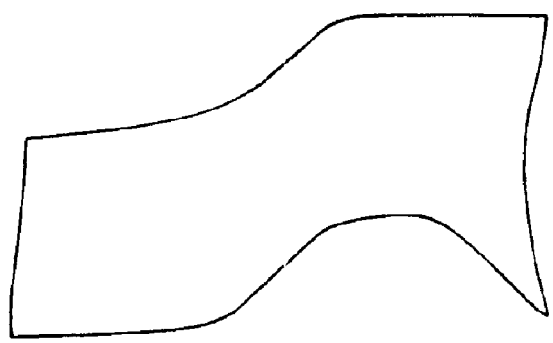
FIG. 18 is a diagram for a further mesh generation example accompanying the extrapolation of a tensor field, according to the embodiment, for generating a mesh for a rectangular shape model by using a template mesh extracted from an additional predetermined shape model.
Figure 18B:
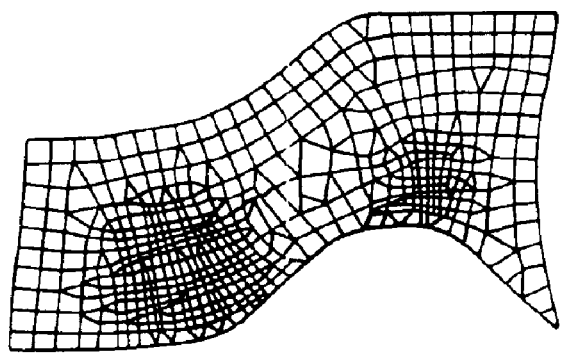
Figure 18C:
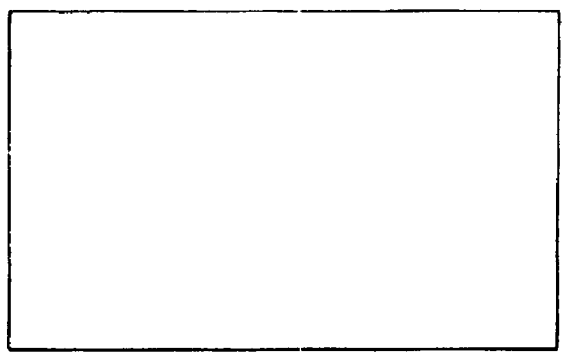
Figure 18D:
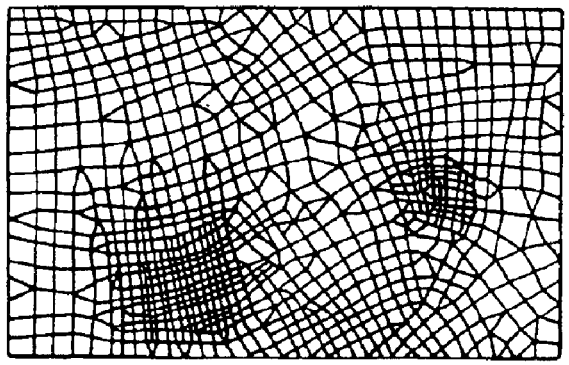
Figure 19A:
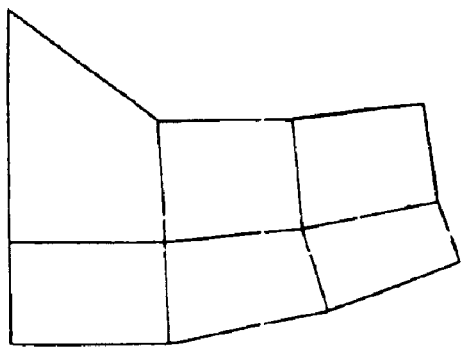
FIG. 19 is a diagram showing a mesh generation example, according to the embodiment, for generating a mesh based on a template mesh that is obtained in advance by providing inner line restrictions.
Figure 19B:
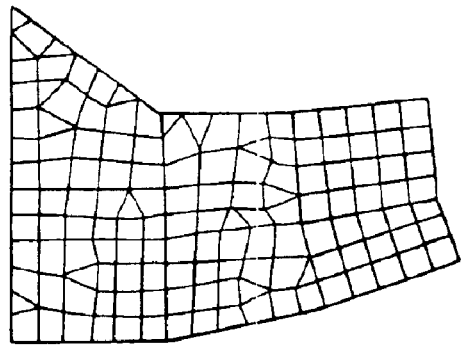
Figure 19C:
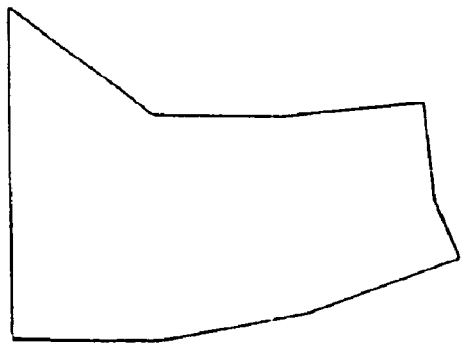
Figure 19D:
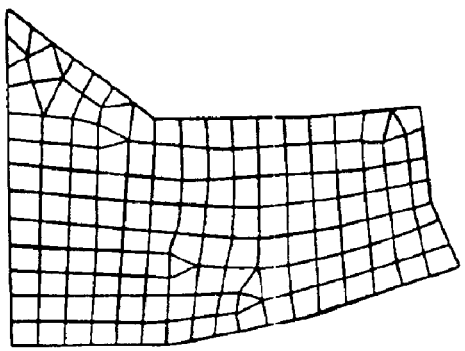
Figure 20A:
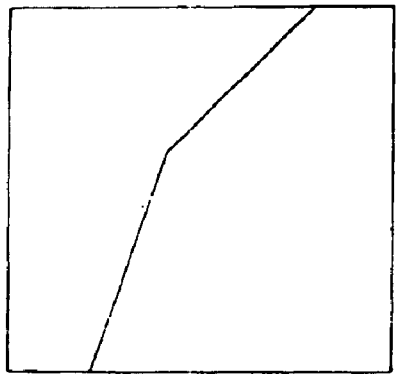
FIG. 20 is a diagram showing another mesh generation example, according to the embodiment, for generating a mesh based on a template mesh that is obtained in advance by providing inner line restrictions.
Figure 20B:
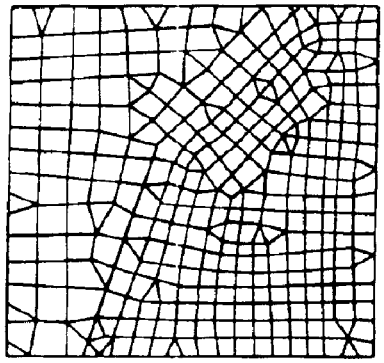
Figure 20C:
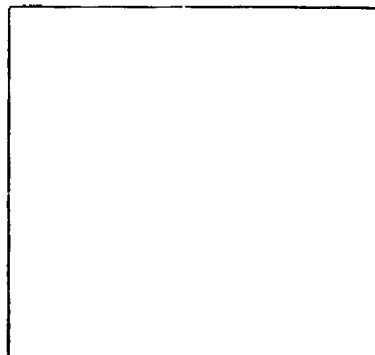
Figure 20D:
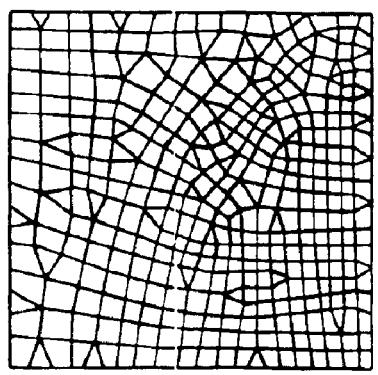

FIG. 11 is a diagram showing the general configuration of a mesh generation system according to this embodiment of the present invention.

The system in this embodiment is employed for a case wherein meshes having the same or similar characteristics are generated for different shape models, such as when a simulation is repeated while changing a shape model.

In FIG. 11, a mesh generation system 20 in this embodiment comprises: a mesh characteristic extraction unit 11, a mesh characteristic change unit 12, a mesh generator 13 and a tensor field extrapolation unit 21. Since the mesh characteristic extraction unit 11, the mesh characteristic change unit 12 and the mesh generator 13 are the same as those in FIG. 2, no further explanation will be given for them.

The tensor field extrapolation unit 21 receives a shape model for which a new mesh has been generated, and employs the shape model to extrapolate, as needed, a tensor field extracted from a template mesh. Therefore, the mesh characteristic change unit 12 alters the tensor field extrapolated by the tensor field extrapolation unit 21, and the mesh generator 13 generates a mesh based on the tensor field provided by the tensor field extrapolation unit 21, or based on the tensor field altered by the mesh characteristic change unit 12.

As is shown in FIG. 8, if the shape model for the mesh generation is completely included in the space occupied by the template mesh, the generation of a mesh for the shape model need only be based on the characteristic (tensor field) extracted from the template mesh. However, if the shape model includes not only the entire space occupied by the template mesh, but is expanded and includes additional external space, a tensor field describing the characteristic must be extrapolated for in a portion not covered by the template mesh, in order to generate a mesh for the entire shape model.

Through the extrapolation of the tensor field performed by the tensor field extrapolation unit 21, the tensor field T, extracted from the template mesh (the tensor field defined for the overall shape model as it exists before being changed), is employed to generate a tensor field T' (tensor field defined for the overall shape model after being changed) that corresponds to the shape model for the generation of a new mesh.

The two following methods are employed for generating a tensor field through extrapolation.

The first is a method for generating a grid (a mesh having a grid structure) completely covering a shape that has been changed, and for calculating a tensor for each node of the grid. Assume that a tensor T0' for one node P0 of the nodes constituting a grid is calculated from a tensor field T before the change. Suppose that the tensor field T of the template mesh is provided by the discrete expression that the tensor Ti (i=1, 2, . . . , n) is given for each node Pi (i=1, 2, . . . , n) forming the template mesh. At this time, the tensor T0' is obtained by solving equation 16.

$$T0'=(u1T01+u2T02+ \ldots +unT0n)/(u1+u2+ \ldots +un), \quad \text{[Equation 16]}$$

where n is the number of nodes constituting the template mesh.

The weighting coefficient wi (i=1, 2, . . . , n) is calculated by using the nodes P0 and Pi (i=1, 2, . . . , n) to solve equation 17.

$$wi=1/\|P0-Pj\|, \text{ or}$$

$$wi=1/\|P0-pj\|^2. \quad \text{[Equation 17]}$$

In the same manner, tensors are calculated for all grid nodes other than the node P0.

The second method is one whereby a grid is generated that covers only a portion wherein tensors are not defined for a shape that has been changed (a portion not included in the shape before it was changed), and for calculating a tensor for each node of the grid. The method for calculating, from the tensor field T before the change, the tensor T0' for the node P0 constituting the grid is exactly the same as the first method.

A mesh generation example for which the above two embodiments are used will now be described.

FIG. 12 is a diagram showing an example for the generation of a mesh when a tensor field extracted from the template mesh is unchanged. Thus, in equation 8, the unit matrix is used as the coordinate transform matrix A. In the example in FIG. 12, a mesh is generated using the template mesh in (12-b) for the shape model in (12-a).

Specifically, first, the tensor field in (12-c) is extracted from the template mesh in (12-b). In FIG. 12, instead of an ellipse, the long axis of an ellipse is displayed to represent the tensor field. However, instead of the long axis, the short axis of the ellipse may be displayed to represent the ellipse. The tensor field (12-c) is used for the shape model in (12-a), and the mesh in (12-d) is obtained. When the template mesh in (12-b) is compared with the mesh in (12-c), a mesh having the same characteristic is generated because the tensor field is unchanged.

FIG. 13 is a diagram showing an example of the generation, for the same shape model, of several types of different size meshes that have the same characteristic.

In order to change a mesh size using ½, for example, only a very simple process for dividing one quadrilateral mesh element into four quadrilateral elements need be performed. Similarly, the mesh size may be easily changed by dividing the original mesh element by ¼, 2 or 4, or by fusing adjacent mesh elements. However, in actuality, changing the mesh size is not easy. For example, to change the mesh size using 0.8, according to the conventional mesh generation method, the original, prepared mesh is abandoned, and a mesh that is 0.8 times the size of the original must be generated from the beginning. In this case, there is no guarantee that when the new mesh is generated the direction of flow of the mesh elements and the aspect ratio will be similar to those of the original mesh.

In this embodiment, however, since multiplication by a constant is used to change a tensor field extracted from a template mesh and to uniformly increase the mesh size, a mesh having an arbitrary size can be easily obtained. In FIG. 13, the mesh pitch of the template mesh in (13-a) is 10 mm. When 10/3 is substituted into variable k(x,y) in equation 9, the 3 mm pitch mesh in (13-b) is obtained. Similarly, when 10/6 is substituted into the variable k(x,y), the 6 mm pitch mesh in (13-c) is obtained; when 10/12 is substituted into the variable k(x,y), the 12 mm pitch mesh in (13-d) is obtained; when 10/15 is substituted into the variable k(x,y), the 15 mm pitch mesh in (13-e) is obtained; and when 10/18 is substituted into the variable k(x,y), the 18 mm pitch mesh in (13-f) is obtained. When the template mesh in (13-a) is compared with the meshes in (13-b) to (13-f), it can easily be seen that when meshes having different sizes are generated the direction of flow of mesh elements and the aspect ratio are maintained substantially unchanged.

FIGS. 14 to 18 are diagrams showing examples of the generation of meshes accompanying the extrapolation of a tensor field according to the embodiment in FIG. 11. FIG. 14 is a diagram showing an example in which a mesh is generated for a quadrilateral shape model by using, as a template mesh, a mesh generated for a circular shape model.

In FIG. 14, the mesh in (14-b) is generated by using the circular shape model in (14-a). Then, a mesh is generated for the quadrilateral shape model in (14-c) by using the mesh in (14-b) as a template mesh. The obtained mesh is shown in (14-d).

FIG. 15 is a diagram for explaining the processing for generating the mesh in (14-d) using the tensor field in (14-b) in FIG. 14.

As is shown in (15-b) in FIG. 15, the area of a target quadrilateral shape model for mesh generation is expanded to include areas outside the template mesh in (15-a). Thus, as is shown in (15-c), the tensor field extracted from the template mesh in (15-a) is extrapolated for the overall quadrilateral shape model. Then, based on the tensor field obtained by extrapolation, a mesh is generated for the quadrilateral shape model.

It should be noted that in the process in FIG. 15, the tensor field extracted from the template mesh in (15-a) is not changed. That is, the unit matrix is used as the coordinate transform matrix A in equation 8. Therefore, while referring to (15-d), a mesh similar to the template mesh is generated for the area corresponding to the template mesh in (15-a), and meshes having a similar characteristic are generated for the included outside areas.

FIGS. 16 to 18 are diagrams showing examples wherein template meshes ((16-b), (17-b) and (18-b)) extracted from various shape models ((16-a), (17-a) and (18-a)) are employed to generate template meshes ((16-d), (17-d) and (18-d)) for rectangular shape models ((16-c), (17-c) and (18-c)).

Although not shown, in all of these cases, extrapolation is performed as needed for the tensor fields extracted from the template meshes ((16-b), (17-b) and (18-b)). Further, the tensor fields extracted from the template meshes ((16-b), (17-b) and (18-b)) are not changed. Therefore, meshes that are similar to the respective template meshes ((16-b), (17-b) and (18-b)) are generated in the corresponding areas. In outside areas, meshes are generated that have characteristics similar to those in the areas corresponding to the template meshes (16-b), (17-b) and (18-b)).

As shown by the examples in FIGS. 16 to 18, even when the same rectangular shape model is a mesh generation target, various types of meshes can be requested, depending on the analysis type. For example, for the analysis of the deformation of the shape when force from above is applied to the top of the shape model, a mesh in (17-d) in FIG. 17 wherein fine elements are arranged on the top is preferable. For the analysis of the deformation of the shape when force is horizontally applied from the right, a mesh wherein fine elements are horizontally arranged on the right is preferable. Further, when the shape model is formed like a plate and an S-shaped reinforcement member is attached to its reverse side, a mesh along an S shape in (16-d) in FIG. 16 is preferable.

As is described above, to generate for a predetermined shape model meshes having various characteristics, appropriate template meshes are selected and are employed as samples, so that only a short period of time is required to generate a mesh having a desired characteristic.

FIGS. 19 and 20 are diagrams showing examples of meshes generated using template meshes that are generated in advance by providing inner line restrictions.

In the examples in FIGS. 19 and 20, inner line restrictions are provided for predetermined shape models ((19-a) and (20-a)), and template meshes ((19-b) and (20-b)) are formed so that the edge of the meshes do not cross the inner line restrictions. The template meshes ((19-b) and (20-b)) are then employed to generate meshes for shape models ((19-c) and (20-c)) that have no inner line restrictions.

When the obtained meshes ((19-d) and (20-d)) are referred to, it is found that meshes have been generated that have trends similar to the template meshes ((19-b) and (20-b)). In the examples in FIGS. 19 and 20, a shape change, i.e., the deletion of the inner line restrictions, is performed; however, since the external outline of the shape is not changed, extrapolation of the tensor field is not used. The tensor fields extracted from the template meshes ((19-b) and (20-b)) are not changed.

As is described above, according to the present invention, since a conventional mesh is employed as a sample to generate a mesh for a predetermined shape model, a high-quality mesh can be efficiently generated.

What is claimed is:

1. A computer-implemented mesh generation system for generating a mesh used for finite element analysis, comprising:
   a mesh characteristic extraction unit which receives a conventional mesh and extracts a characteristic from said conventional mesh,
   a mesh characteristic change unit which changes a characteristic of a mesh extracted by said mesh characteristic extraction unit,
   a mesh generator which generates a mesh for a target shape model in accordance with
      a characteristic extracted by said mesh characteristic extraction unit or
      a characteristic extracted by said mesh characteristic extraction unit as changed by said mesh characteristic change unit, and
   a display to which said mesh may be sent as an output.

2. According to claim 1, wherein said mesh characteristic extraction unit extracts said characteristic of said conventional mesh based on the geometrical characteristic of the elements of said conventional mesh.

3. The mesh generation system according to claim 1, wherein said mesh characteristic extraction unit extracts said characteristic as a tensor field.

4. The mesh generation system according to claim 1, further comprising:
   a mesh characteristic changing unit for changing said characteristic of said conventional mesh extracted by said mesh characteristic extraction unit,
   wherein said mesh generator generates a mesh based on said characteristic of said mesh changed by said mesh characteristic changing unit.

5. The mesh generation system according to claim 3, further comprising:
   a tensor field synthesization unit for synthesizing tensor fields describing multiple mesh characteristics extracted by said mesh characteristic extraction unit,
   wherein said mesh generator generates a mesh by using the tensor field obtained by said tensor field synthesization unit.

6. The mesh generation system according to claim 3, further comprising:
   a tensor field extrapolation unit, for receiving a shape model for mesh generation and for extrapolating said tensor field that is extracted by said mesh characteristic extraction unit and that indicates said characteristic of said conventional mesh, so that said tensor field matches said shape model,
   wherein said mesh generator generates a mesh by using said tensor field obtained by said tensor field extrapolation unit.

7. The mesh generation system according to claim 3, wherein:
   said mesh generation unit generates a mesh for a target shape model based on the characteristic of a predetermined mesh consonant with an analysis purpose; and
   a finite element analysis unit performs a finite element analysis based on said mesh generated by said mesh generator.

8. The analysis system according to claim 7, wherein said mesh generation unit generates a mesh for said shape model based on said mesh characteristic represented as said tensor field.

9. A computer-implemented method for generating a mesh used for finite element analysis, comprising the steps of:
   using a mesh characteristic extraction unit to receive a conventional mesh and extract a characteristic from said conventional mesh,
   using a mesh characteristic change unit to change a characteristic of a mesh extracted by said mesh characteristic extraction unit,
   using a mesh generator to generate a mesh for a target shape model in accordance with
      a characteristic extracted by said mesh characteristic extraction unit or
      a characteristic extracted by said mesh characteristic extraction unit as changed by said mesh characteristic change unit, and
   sending said mesh as an output to a display.

10. The method of claim 9, wherein the step of using a mesh characteristic extraction unit to receive a conventional mesh and extract a characteristic from said conventional mesh includes the step of:
    extracting the characteristic of said mesh as a tensor field.

11. The method according to claim 10, wherein the step of using a mesh characteristic extraction unit to receive a conventional mesh and extract a characteristic from said conventional mesh further includes the steps of:
    calculating an inertia tensor for each of the elements of said mesh; and
    calculating an overall tensor field for said mesh based on said inertia tensor obtained for each of said elements.

12. The method of claim 9, wherein the step of using a mesh characteristic extraction unit to receive a conventional mesh and extract a characteristic from said conventional mesh includes the step of:
    extracting a characteristic of an analysis target mesh as a tensor field.

13. The method of claim 9, wherein the step of using a mesh generator to generate a mesh for a target shape model includes the step of:
    generating a mesh for a predetermined shape model based on the extracted characteristic.

14. The method according to claim 13, further including the steps of:
    calculating the size of each of said elements of said conventional mesh; and
    employing the size of each of said elements to calculate a field describing said characteristic of said conventional mesh and corresponding to said overall conventional mesh.

15. The method according to claim 13, further including the steps of:
    calculating not only the sizes of said elements of said conventional mesh, but also, for each of said elements, the direction of flow, and the size and the aspect ratio of an ellipse or of an ellipsoid, which are defined based on said elements; and employing said direction of flow, and said size and said aspect ratio of said ellipse or said ellipsoid, to calculate a field describing said characteristic of said conventional mesh and corresponding to the overall conventional mesh.

16. The method according to claim 13, further including the steps of:

calculating an inertia tensor for each of said elements of said conventional mesh;

calculating a tensor field, based on said inertia tensor obtained for each of said elements, for said overall conventional mesh; and extrapolating said obtained tensor field, so that for mesh generation said tensor field matches said shape model.

17. The method according to claim 13, further including the steps of:

calculating an inertia tensor for each of said elements of said conventional mesh; and employing said inertia tensor for each of said elements to directly calculate a tensor field that is extrapolated for the entire shape model.

18. A program transmission apparatus for instructing a computer to generate a mesh used for finite element analysis, comprising:

storage medium for computer code implementing the steps of:

processing a mesh characteristic extraction unit which receives a conventional mesh and extracts a characteristic from said conventional mesh, processing a mesh characteristic change unit which changes a characteristic of a mesh extracted by said mesh characteristic extraction unit, processing a mesh generator which generates a mesh for a target shape model in accordance with
 a characteristic extracted by said mesh characteristic extraction unit or
 a characteristic extracted by said mesh characteristic extraction unit as changed by said mesh characteristic change unit, and processing said mesh as an output to a display.

19. The program transmission apparatus according to claim 18, wherein said computer code contained in said storage medium further implements the step of:

processing the calculation of a tensor field defined based on said elements of said predetermined mesh in order to extract said characteristic.

20. The program transmission apparatus according to claim 18, further comprising:

transmission means for reading said program from said storage medium and transmitting said program.

21. A design support system, for using a computer to support design, comprising:

a mesh generation system which receives a template mesh as an input for a mesh characteristic extraction unit and receives a shape model as an input for a mesh generator;

a mesh characteristic extraction unit which receives a conventional mesh and extracts a characteristic from said conventional mesh, a mesh characteristic change unit which changes a characteristic of a mesh extracted by said mesh characteristic extraction unit, a mesh generator which generates a mesh for a target shape model in accordance with
 a characteristic extracted by said mesh characteristic extraction unit or
 a characteristic extracted by said mesh characteristic extraction unit as changed by said mesh characteristic change unit, and a display to which said mesh may be sent as an output.

22. The design support system of claim 21, wherein said mesh generation system may also receive a shape model as an input for a tensor field extraction unit.

23. The design support system according to claim 22, wherein said mesh generation unit extracts the characteristic of a predetermined mesh as a tensor field, and employs said characteristic to generate a mesh for said shape model.

* * * * *